(12) United States Patent
Nishikawa et al.

(10) Patent No.: US 6,271,326 B1
(45) Date of Patent: Aug. 7, 2001

(54) OLEFIN POLYMER, PROCESS FOR MANUFACTURING THE SAME, CURABLE RESIN COMPOSITION, AND ANTIREFLECTION COATING

(75) Inventors: Akira Nishikawa; Fusaka Watanabe; Yuichi Hashiguchi; Hozumi Sato, all of Tsukuba (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/299,660

(22) Filed: Apr. 27, 1999

(30) Foreign Application Priority Data

Apr. 30, 1998 (JP) .................................................. 10-120285

(51) Int. Cl.[7] ........................... C08F 14/24; C08F 214/24
(52) U.S. Cl. .................... 526/242; 526/250; 526/279; 525/104; 525/477; 525/539
(58) Field of Search .................................. 526/242, 250, 526/279; 525/104, 477, 539

(56) References Cited

U.S. PATENT DOCUMENTS

| 4,150,013 | * | 4/1979 | Punderson | 260/42.26 |
| 5,760,136 | * | 6/1998 | Kato et al. | 525/100 |
| 6,051,665 | * | 4/2000 | Yamada et al. | 525/477 |

\* cited by examiner

Primary Examiner—David W. Wu
Assistant Examiner—R. Harlan
(74) Attorney, Agent, or Firm—Oblon & Spivak, McClelland, Maier & Neustadt P.C.

(57) ABSTRACT

An olefin polymer and a curable resin composition which can form cure coatings with excellent transparency, low reflectance, and high scratch resistance, an antireflection film exhibiting excellent transparency, low reflectance, and high scratch resistance are disclosed. The olefin polymer comprises a polysiloxane segment in the main chain, has 30 wt % or more fluorine content, and has a polystyrene-reduced number average molecular weight of 5,000 or more. The curable resin composition comprises the olefin polymer. The antireflection film is made from the cured product of the curable resin composition.

18 Claims, 2 Drawing Sheets

OLEFIN POLYMER, PROCESS FOR MANUFACTURING THE SAME, CURABLE RESIN COMPOSITION, AND ANTIREFLECTION COATING

BACKGROUND OF THE INVENTION

1. Field of the Invention

The present invention relates to an olefin polymer, a process for manufacturing the olefin polymer, a curable resin composition, and an antireflection coating. More particularly, the present invention relates to an olefin polymer capable of forming cured coatings exhibiting excellent transparency, low reflectance, and superior scratch resistance, a process for manufacturing the olefin polymer, a curable resin composition, and antireflection coating.

2. Description of the Background Art

Recent development of multimedia has induced development of various display devices. Excellent visibility is particularly important for such display devices, especially for the display devices used with portable equipment for outdoor use. Improvement in the visibility is also desired for large display devices. This is a technological subject to be solved.

One of the conventional means to improve the visibility of display devices is to provide an antireflection coating of a material with a low index of refraction on the substrate. A method of forming a thin film of fluorine compound by vapor deposition, for example, is known as a means for providing such an antireflection coating.

Requirement of industries for such a technology in recent years is inexpensive antireflection coatings adaptable for large display device such as various liquid crystal display equipment. However, it is difficult for the vapor deposition technology to produce uniform antireflection coating on a large substrate at a high efficiency. Moreover, because the vapor deposition technology requires expensive vacuum equipment, it is difficult to reduce the cost for forming such antireflection coatings.

In view of this situation, a method of forming an antireflection coating comprising preparing a liquid composition by dissolving a fluorine-containing polymer with a low refractive index in an organic solvent and coating this composition on the surface of substrates has been studied. For example, Japanese Patent Applications Laid-open No.40845/1986, and No. 1527/1989, and Japanese Patent Application Publication No. 98703/1994 disclose a method of coating a fluorinated alkyl silane onto the surface of substrates. Japanese Patent Application Laid-open No. 115023/1994 discloses a method of coating a fluorine-containing polymer which possesses a specific structure. Moreover, Japanese Patent Application Laid-open No. 100136/1996 discloses a method of coating a UV curable fluorine-containing coating material.

However, conventional coating fluorine-containing materials for forming antireflection coatings exhibited a slow cure speed which resulted in inferior productivity, because these are thermoset type materials. In addition, the coatings produced from the UV curable fluorine-containing coating material exhibited insufficient scratch resistance, giving rise to peeling of the antireflection coatings, particularly when the films are repeatedly scratched or rubbed.

In many display devices, the antireflection coatings are produced on the outermost part or the surface. It is desirable that stains such as finger-prints adhered on the surface can be wiped off with ease. However, if a fluorine content of the material is increased to decrease the surface energy of the coatings, the solubility of the composition in commonly used solvents may decrease. This necessitates the use of halogen-containing solvents which are not only inexpensive, but also environmentally hazardous.

The present invention has been achieved to overcome the above-mentioned problems in conventional technologies.

An object of the present invention is therefore to provide an olefin copolymer capable of forming cured coatings exhibiting excellent transparency, a low index of refraction, a superior antireflection effect, and superb scratch resistance.

Another object of the present invention is to provide an olefin copolymer which is soluble in general hydrocarbon solvents.

Still another object of the present invention is to provide a curable resin composition capable of forming cured coatings which not only exhibits excellent transparency, a low index of refraction, and a superior antireflection effect, but also exhibits high scratch resistance.

A further object of the present invention is to provide a curable resin composition which can form cured coatings exhibiting superior adhesion to substrates.

A still further object of the present invention is to provide a curable resin composition which can form cured coatings having excellent anti-fouling properties.

A still further object of the present invention is to provide a curable resin composition which can be dissolved in common hydrocarbon solvents.

A still further object of the present invention is to provide an antireflection coating which not only exhibits excellent transparency, a low index of refraction, and a superior antireflection effect, but also exhibits high scratch resistance.

SUMMARY OF THE INVENTION

The above objects can be achieved in the present invention by an olefin polymer comprising a polysiloxane segment in the main chain, having 30 wt % or more fluorine content, and having a polystyrene-reduced number average molecular weight of 5000 or more.

The above objects can be further achieved in the present invention by an olefin polymer having a polystyrene-reduced number average molecular weight measured by gel permeation chromatography from 5,000 to 500,000 and comprising:

(a) 20 to 70 mol % of the structural unit represented by the following general formula (1),

wherein $R^1$ represents a fluorine atom, a fluoro alkyl group, or the group $-OR^2$ (wherein $R^2$ represents an alkyl group or a fluoro alkyl group), (b) 10 to 70 mol % of the structural unit represented by the following general formula (2),

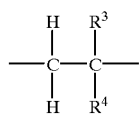

(2)

wherein R³ represents a hydrogen atom or a methyl group and R⁴ represents an alkyl group, the group represented by —(CH$_2$)$_x$—OR⁵ (wherein R⁵ indicates an alkyl group, hydroxy alkyl group, or glycidyl group, and x is 0 or 1), the group represented by —OCOR⁵, a carboxyl group, or an alkoxylcarbonyl group, and (c) 0.1 to 20 mol % of the structural unit originating from an azo group-containing polysiloxane compound and represented by the following general formula (3),

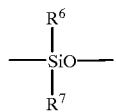

(3)

wherein $R^6$ and $R^7$ may be the same or different and individually represent a hydrogen atom, alkyl group, halogenated alkyl group, or aryl group.

In a preferred embodiment, the above-mentioned olefin polymer further comprises (d) 0.1 to 5 mol % of the structural unit represented by the following general formula (4),

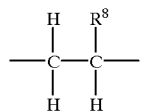

(4)

wherein $R^8$ represents a group which possesses emulsification function.

The above objects can be further achieved in the present invention by an olefin polymer having a polystyrene-reduced number average molecular weight measured by gel permeation chromatography from 5,000 to 500,000 and comprising:

(a) 20 to 70 mol % of the structural unit represented by the above general formula (1), (b) 10 to 70 mol % of the structural unit represented by the above general formula (2), and (e) 0.1 to 10 mol % (as the group -(OSiR¹⁵,R¹⁷)$_y$—, wherein R¹⁵ and R¹⁷ individually represent a hydrogen atom or alkyl group, and y represents the number from 1 to 500) of the structural unit originating from an azo group-containing polysiloxane compound and represented by the following general formula (5),

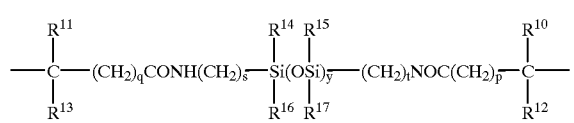

(5)

wherein $R^{10}$ to $R^{13}$ may be the same or different and individually represent a hydrogen atom, alkyl group, or cyano group, $R^{14}$ to $R^{17}$ may be the same or different and individually represent a hydrogen atom or alkyl group, p and q individually represent the number from 1 to 6, s and t individually represent the number from 0 to 6, and y represents the number from 1 to 500, preferably from 1 to 200.

In a preferred embodiment, the above-mentioned olefin polymer further comprises 0.1 to 5 mol % of the structural unit (d) of the above-mentioned formula (4).

The above-described objects can further be achieved in the present invention by a process for manufacturing an olefin copolymer comprising reacting a fluorine-containing olefin compound, a monomer compound other than the fluorine-containing olefin compound, but copolymerizable therewith, and an azo group-containing polysiloxane compound.

The above-described objects can further be achieved in the present invention by a process for manufacturing an olefin copolymer comprising reacting a fluorine-containing olefin compound, a monomer compound other than the fluorine-containing olefin compound, but copolymerizable therewith, an azo group-containing polysiloxane compound, and a reactive emulsifying agent.

The above-described objects can further be achieved in the present invention by a curable resin composition comprising an olefin polymer having a polysiloxane segment in the main chain, having a fluorine content of 30 wt % or more, and a polystyrene-reduced number average molecular weight of 5,000 or more.

The above-described objects can further be achieved in the present invention by a curable resin composition comprising an olefin polymer having a polysiloxane segment in the main chain, having a fluorine content of 30 wt % or more, and a polystyrene-reduced number average molecular weight of 5,000 or more, and a solvent.

In a preferred embodiment, the above-described curable resin composition comprises the above-mentioned olefin polymer and a crosslinking compound.

In a preferred embodiment, the above-described curable resin composition comprises a crosslinked polymer which is a reaction product of the above-mentioned olefin polymer and crosslinking compound.

In a preferred embodiment, the above-described curable resin composition comprises an olefin polymer which contains a hydroxyl group.

In a preferred embodiment, the above-described curable resin composition comprises an olefin polymer which contains an epoxy group.

The above-described objects can further be achieved in the present invention by a curable resin composition comprising, (A) an olefin polymer having a polysiloxane segment in the main chain, a fluorine content of 30 wt % or more, and a polystyrene-reduced number average molecular weight of 5000 or more, (B) a polyfunctional (meth)acrylate compound which contains 2 or more (meth)acryloyl groups in the molecule, and (C) a radiation-active initiator.

The above-described objects can further be achieved in the present invention by an antireflection coating made from a cured product of the above-described curable resin composition.

Other objects, features and advantages of the invention will hereinafter become more readily apparent from the following description.

DETAILED DESCRIPTION OF THE INVENTION AND PREFERRED EMBODIMENTS

<Olefin Polymer>

Figure 1:
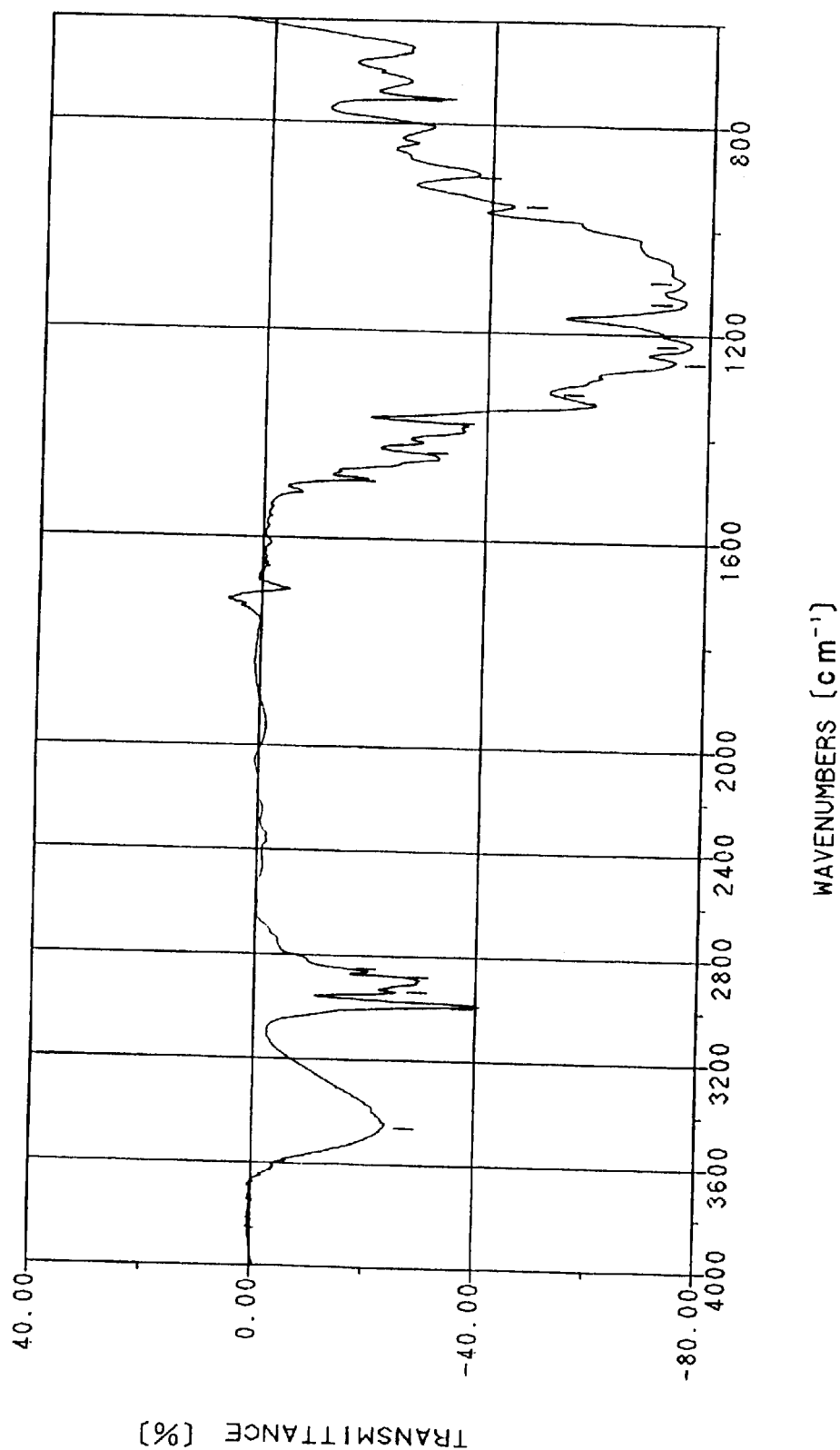
FIG. 1 is a chart showing the IR absorption spectrum of the fluorine-containing copolymer prepared in Preparation Example 1.

The curable resin composition of the present invention comprises an olefin polymer having a polysiloxane segment in the main chain, a fluorine content of 30 wt % or more, and a polystyrene-reduced number average molecular weight of 5,000 or more, as an essential component. This olefin polymer is hereinafter called "specific fluorine-containing polymer".

In the present invention, the specific fluorine-containing polymer has the polysiloxane segment represented by the following general formula (6) in the main chain,

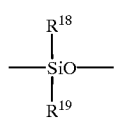

(6)

wherein $R^{18}$ and $R^{19}$ may be the same or different and individually represent a hydrogen atom, alkyl group, halogenated alkyl group, or aryl group. The proportion of the polysiloxane segment in the specific fluorine-containing polymer is usually from 0.1 to 20 mol %.

The fluorine content of the specific fluorine-containing polymer is 30 wt % or more, preferably from 30 to 70 wt %, and more preferably from 40 to 60 wt %. The specific fluorine-containing polymer has a polystyrene-reduced number average molecular weight measured by gel permeation chromatography of 5000 or more, and preferably from 10,000 to 500,000.

Here, the "fluorine content" is the value measured by the Alizarin Complexone method and the "number average molecular weight" is the value measured by gel permeation chromatography using tetrahydrofuran as a solvent.

The following copolymers (1) to (4) can be given as preferred examples of the specific fluorine-containing polymer (the olefin polymer of the present invention).

(1) The copolymer comprising 20 to 70 mol %, preferably 25 to 65 mol %, and more preferably 30 to 60mol % of the structural unit (a), 10 to 70 mol %, preferably 15 to 65 mol %, and more preferably 30 to 60 mol % of the structural unit (b), and 0.1 to 20 mol %, preferably 0.1 to 15 mol %, more preferably 0.1 to 10 mol %, most preferably 0.1 to 5 mol %, and ideally 0.1 to 3 mol % of the structural unit (c) (such a copolymer is hereinafter referred to as "fluorine-containing polymer IX").

(2) The copolymer comprising 20 to 70 mol %, preferably 25 to 65 mol %, and more preferably 30 to 60 mol % of the structural unit (a), 10 to 70 mol %, preferably 15 to 65 mol %, and more preferably 30 to 60 mol % of the structural unit (b), 0.1 to 20 mol %, preferably 0.1 to 15 mol %, more preferably 0.1 to 10 mol %, most preferably 0.1 to 5 mol %, and ideally 0.1 to 3 mol % of the structural unit (c), and 0.1 to 10 mol %, preferably 0.1 to 5 mol %, more preferably 0.1 to 3 mol %, and particularly preferably 0.5 to 3 mol % of the structural unit (d) (such a copolymer is hereinafter referred to as "fluorine-containing polymer IIX")

(3) The copolymer comprising 20 to 70 mol %, preferably 25 to 65 mol %, and more preferably 30 to 60 mol % of the structural unit (a), 10 to 70 mol %, preferably 15 to 65 mol %, and more preferably 30 to 60 mol % of the structural unit (b), and the structural unit (e) in the amount of 0.1 to 10 mol %, preferably 0.1 to 5 mol %, and more preferably 0.1 to 3 mol %, as the group —$(OSiR^{15}R^{17})_y$— (such a copolymer is hereinafter referred to as "fluorine-containing polymer IY").

(4) The copolymer comprising 20 to 70 mol %, preferably 25 to 65 mol %, and more preferably 30 to 60mol % of the structural unit (a), 10 to 70 mol %, preferably 15 to 65 mol %, and more preferably 30 to 60 mol % of the structural unit (b), and the structural unit (e) in the amount of 0.1 to 10 mol %, preferably 0.1 to 5 mol %, and more preferably 0.1 to 3 mol %, as the group —$(OSiR^{15}R^{17})_y$—, and 0.1 to 10 mol %, preferably 0.1 to 5 mol %, more preferably 0.1 to 3 mol %, and particularly preferably 0.5 to 3 mol % of the structural unit (d) (such a copolymer is hereinafter referred to as "fluorine-containing polymer IIY").

If the content of the structural unit (a) is less than 20 mol %, the fluorine content of the fluorine-containing polymer is too small. It is difficult to produce cured products with a sufficiently low index of refraction from the resin composition which contains such a fluorine-containing polymer.

On the other hand, if the content of the structural unit (a) is more than 70 mol %, the solubility of the fluorine-containing polymer in organic solvents markedly decreases, resulting in poor transparency and lowered adhesion to substrates of the cured coating made from the resin composition comprising this material.

If the amount of the structural unit (b) is less than 10 mol %, the resulting fluorine-containing polymer exhibits only poor solubility in organic solvents; if more than 70 mol %, the resin composition containing this fluorine-containing polymer produces cured coatings with inferior transparency and insufficient optical properties such as low reflectance.

If the amount of the structural unit (c) in the fluorine-containing polymer (the fluorine-containing polymer IX and fluorine-containing polymer IIX) exceeds 20 mol %, the resin composition containing such a fluorine-containing polymer tends to be repelled when coated onto substrates and tends to produce cured products with inferior transparency.

If the amount of the structural unit (d) in the fluorine-containing polymer (the fluorine-containing polymer IIX and fluorine-containing polymer IIY) is more than 10 mol %, the resin composition which contains such a fluorine-containing polymer has a high viscosity, so that the composition cannot be handled with ease. In addition, the moisture resistance will be insufficient if the resin composition is used as a coating material.

If the amount of the structural unit (e) as the group —$(OSiR^{15}R^{17})_y$— in the fluorine-containing polymer (the fluorine-containing polymer IY and fluorine-containing polymer IIY) is more than 10 mol %, the resin composition containing such a fluorine-containing polymer tends to be repelled when coated onto substrates and tends to produce cured products with inferior transparency.

As examples of the fluoroalkyl group represented by $R^1$ in the above-mentioned general formula (1) of the structural unit (a), fluoroalkyl groups having 1–6 carbon atoms such as a trifluoromethyl group, perfluoroethyl group, perfluoropropyl group, perfluorobutyl group, perfluorohexyl group, and perfluorocyclohexyl group can be given. As examples of the alkyl group represented by $R^2$ in the group $R^1(-OR^2)$ in the above-mentioned general formula (1), alkyl groups having 1–6 carbon atoms such as a methyl group, ethyl group, propyl group, butyl group, hexyl group, and cyclohexyl group can be given. As examples of the fluoroalkyl group represented by $R^2$, the same fluoroalkyl groups as given for $R^1$ can be given.

Given as examples of $R^4$ in the above-mentioned general formula (2) of the structural unit (b) are alkyl groups having 1–12 carbon atoms such as a methyl group, ethyl group, propyl group, hexyl group, cyclohexyl group, and lauryl group, and alkoxyl carbonyl groups such as a methoxy carbonyl group, ethoxy carbonyl group, and the like. As examples of the alkyl group represented by $R^5$ in the structures —$(CH_2)x$—$OR^5$ or —$OCOR^5$ which indicates $R^4$ in the above-mentioned general formula (2), the same alkyl group as given for $R^4$ can be given; and as examples of the hydroxyalkyl group represented by $R^5$, 2-hydroxyethyl group, 2-hydroxypropyl group, 3-hydroxypropyl group, 4-hydroxybutyl group, 3-hydroxybutyl group, 5-hydroxypentyl group, 6-hydroxyhexyl group, and the like can be given.

As examples of the alkyl group represented by $R^6$ or $R^7$ in the above-mentioned general formula (3) of the structural unit (c), alkyl groups having 1–3 carbon atoms such as a methyl group, ethyl group, and propyl group can be given; as the halogenated alkyl group represented by $R^6$ or $R^7$, fluoroalkyl group having 1–4 carbon atoms such as a trifluoromethyl group, perfluoroethyl group, perfluoropropyl group, and perfluorobutyl group can be given. As examples of the aryl group represented by $R^6$ or $R^7$, phenyl group, benzyl group, naphthyl group, and the like can be given.

As the group exhibiting the emulsifying activity represented by $R^8$ in the above-mentioned general formula (4) of the structural unit (d), the groups having both a hydrophobic group and a hydrophilic group, and having the group with a polyether structure such as a polyethylene oxide or polypropylene oxide as the hydrophilic group are desirable. As a specific example of the group exhibiting the emulsifying activity represented by $R^8$ in the above-mentioned general formula (4), the groups represented by the following general formula (7) can be given:

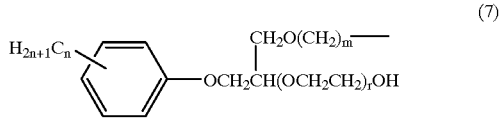

(7)

wherein m, and r are the numbers of the repeating units, with preferred ranges being n=1–20, m=0–4, and r=3–50.

As examples of the alkyl group represented by $R^{10}$ to $R^{13}$ of the above-mentioned general formula (5) of the structural unit (e), alkyl groups having 1–12 carbon atoms such as a methyl group, ethyl group, propyl group, hexyl group, and cyclohexyl group can be given. As the alkyl group represented by $R^{14}$ to $R^{17}$ of the above-mentioned general formula (5), alkyl groups having 1–3 carbon atoms such as a methyl group, ethyl group, and propyl group can be given.

Here, the specific fluorine-containing polymer (olefin polymer of the present invention) may contain two or more structural units (a).

The specific fluorine-containing polymer may also contain two or more structural units (b).

The specific fluorine-containing polymer (the fluorine-containing polymer IX and fluorine-containing polymer IIX) may also contain two or more structural units (c).

Also, the specific fluorine-containing polymer (the fluorine-containing polymer IY and fluorine-containing polymer IIY) may contain two or more structural units (e).

The fluorine-containing polymer IX comprises the blocks in which the structural unit (a) and structural unit (b) are randomly bonded and the blocks of structural unit (c).

The fluorine-containing polymer IIX comprises the blocks in which the structural unit (a), structural unit (b), and structural unit (d) are randomly bonded and the blocks of the structural unit (c).

The fluorine-containing polymer IY comprises the blocks in which the structural unit (a) and structural unit (b) are bonded randomly and the blocks of the structural unit (e).

The fluorine-containing polymer IIY comprises the blocks in which the structural unit (a), structural unit (b), and structural unit (d) are bond randomly and the blocks of the structural unit (e).

The specific fluorine-containing polymer (the olefin polymer of the present invention) has a polystyrene-reduced number average molecular weight of 5,000 or more, preferably from 5,000 to 500,000, more preferably from 10,000 to 300,000, and particularly preferably from 10,000 to 100,000, as measured by gel permeation chromatography (GPC) using tetrahydrofuran (THF) as a solvent.

If the number average molecular weight is less than 5,000, the mechanical strength of the fluorine-containing copolymer tends to be insufficient. On the other hand, if the number average molecular weight is too large, the viscosity of the resin composition comprising said fluorine-containing polymer may increase excessively, giving rise to difficulty in forming uniform coatings when the composition is used as a coating material.

The fluorine content of the specific fluorine-containing polymer (the olefin polymer of the present invention) is 30 wt % or more, preferably from 30 to 70 wt %, and more preferably from 40to60wt %. The fluorine content is determined from the weight of fluorine atom measured by the Alizarin Complexone method.

The fluorine-containing polymer IX which is the specific fluorine-containing polymer of the present invention can be obtained by reacting (a) a fluorine-containing olefin compound (hereinafter called "component (a)"), (b) a monomer compound other than the component (a) but copolymerizable with the component (a) (hereinafter called "component (b)"), and (c) an azo group-containing polysiloxane compound (hereinafter called "component (c)").

The fluorine-containing polymer IIX which is the specific fluorine-containing polymer of the present invention can be obtained by reacting the component (a), component (b), component (c), and (d) a reactive emulsifying agent (hereinafter called "component (d)").

Specifically, the structural units (a), (b), (c), and (d) in the specific fluorine-containing polymer respectively originate from the components (a), (b), (c), and (d).

The fluorine-containing polymer IY which is the specific fluorine-containing polymer of the present invention can be obtained by reacting the component (a), component (b), and an azo-group containing polysiloxane compound which is a compound to introduce the structural unit (e) (hereinafter called "component (e)").

The fluorine-containing polymer IIY which is the specific fluorine-containing polymer can be obtained by reacting the component (a), component (b), component (e), and component (d).

The compounds having at least one fluorine atom and at least one polymerizable unsaturated double bond can be given as the component(a) Specific examples include (1) fluoroolefins such as tetrafluoroethylene, hexafluoropropylene, 3,3,3-trifluoropropylene, and chlorotrifluoroethylene; (2) alkyl perfluorovinyl ethers or alkoxyalkyl perfluorovinyl ethers represented by the general formula $CF_2$=$CF$—$OR^2$ (wherein —$OR^2$ is the group constituting the group $R^1$ in the general formula); (3) perfluoro(alkyl vinyl ethers) such as perfluoro (methyl vinyl ether), perfluoro (ethyl vinyl ether), perfluoro(propyl vinyl ether), perfluoro(butyl vinyl ether), perfluoro(isobutyl vinyl ether), and the like; (4) perfluoro(alkoxyalkyl vinyl ethers) such as perfluoro(propoxypropyl vinyl ether), and the like; (5) fluorine-containing (meth)acrylates such as trifluoroethyl (meth)acrylate, tetrafluoropropyl (meth)acrylate, octafluoropentyl (meth)acrylate, heptadecafluorodecyl (meth)acrylate; and the like. These compounds may be used either individually or in combinations of two or more.

Of these, fluoroolefins, perfluoro(alkyl vinyl ethers), and perfluoro(alkoxyalkyl vinyl ethers) are preferred, and combinations of these compounds are particularly preferred. Specifically, the use of hexafluoro propylene, perfluoropropyl vinyl ether, and perfluoropropoxypropyl vinyl ether, either individually or in combinations of two or more, is preferable.

Given as specific examples of the component (b) which is copolymerizable with the component (a) are: (1) alkyl vinyl ethers and cycloalkyl vinyl ethers such as methyl vinyl ether, ethyl vinyl ether, n- propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, lauryl vinyl ether, cetyl vinyl ether, 2- ethylhexyl vinyl ether, and cyclohexyl vinyl ether; (2) carboxylic acid vinyl esters such as vinyl acetate, vinyl propionate, vinyl butyrate, vinyl pivalate, vinyl caproate, vinyl versatate, vinyl stearate, and vinyl benzoate; (3) α-olefins such as ethylene, propylene, and isobutene; (4) vinyl aromatic compounds such as styrene, α-methylstyrene, o-methyl styrene, m-methylstyrene, p-methylstyrene, p-tert-butyl styrene, diisopropenyl benzene, o-chlorostyrene, m-chlorostyrene, p-chlorostyrene, 1,1-diphenylethylene, p-methoxystyrene, N,N-dimethyl-p-aminostyrene, N,N-diethyl-p-aminostyrene, vinyl pyridine, and vinyl imidazole; (5) carboxyl group-containing compounds such as (meth)acrylic acid, crotonic acid, maleic acid, fumaric acid, and itaconic acid; (6) alkyl (meth) acrylates such as methyl (meth)acrylate, ethyl (meth) acrylate, propyl (meth)acrylate, isopropyl (meth)acrylate, butyl (meth)acrylate, isobutyl (meth)acrylate, tert-butyl (meth)acrylate, pentyl (meth)acrylate, amyl (meth)acrylate, isoamyl (meth)acrylate, hexyl (meth)acrylate, heptyl (meth) acrylate, octyl (meth)acrylate, iso-octyl (meth)acrylate, 2-ethylhexyl (meth)acrylate, nonyl (meth)acrylate, decyl (meth)acrylate, iso-decyl (meth)acrylate, undecyl (meth) acrylate, dodecyl (meth)acrylate, lauryl (meth)acrylate, stearyl (meth)acrylate, and iso-stearyl (meth)acrylate; (7) hydroxyalkyl (meth)acrylates such as a hydroxyethyl (meth) acrylate, hydroxypropyl (meth)acrylate, and hydroxybutyl (meth)acrylate; (8) phenoxyalkyl (meth)acrylates such as phenoxyethyl (meth)acrylate, and 2-hydroxy-3-phenoxypropyl (meth)acrylate; (9) alkoxyalkyl (meth) acrylates such as methoxyethyl (meth)acrylate, ethoxyethyl (meth)acrylate, propoxyethyl (meth)acrylate, butoxyethyl (meth)acrylate, and methoxybutyl (meth)acrylate; (10) polyethylene glycol (meth)acrylates such as polyethylene glycol mono(meth)acrylate, ethoxydiethylene glycol (meth) acrylate, methoxypolyethylene glycol (meth)acrylate, phenoxypolyethylene glycol (meth)acrylate, and nonylphenoxypolyethylene glycol (meth)acrylate; (11) polypropylene glycol (meth)acrylates such as polypropylene glycol mono (meth)acrylate, methoxypolypropylene glycol (meth) acrylate, ethoxypolypropylene glycol (meth)acrylate, and nonylphenoxypolypropylene glycol (meth)acrylate; (12) cycloalkyl (meth)acrylates such as cyclohexyl (meth) acrylate, 4-butylcyclohexyl (meth)acrylate, dicyclopentanyl (meth)acrylate, dicyclopentenyl (meth)acrylate, dicyclopentadienyl (meth)acrylate, bornyl (meth)acrylate, isobornyl (meth) acrylate, and tricyclodecanyl (meth) acrylate; (13) benzyl (meth)acrylate, tetrahydrofurfuryl (meth)acrylate, and (meth)acrylate compounds represented by the following general formulas (8) to (10):

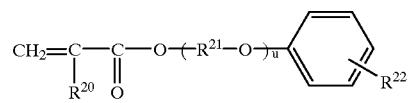

(8)

wherein $R^{20}$ represents a hydrogen atom or methyl group, $R^{21}$ is an alkylene group having 2–6 carbon atoms, $R^{22}$ is a hydrogen atom or an alkyl group having 1–12 carbon atoms, u is an integer from 0 to 12,

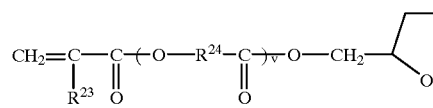

(9)

wherein $R^{23}$ is a hydrogen atom or methyl group, $R^{24}$ is an alkylene group having 2–8 carbon atoms, v is an integer from 1 to 8,

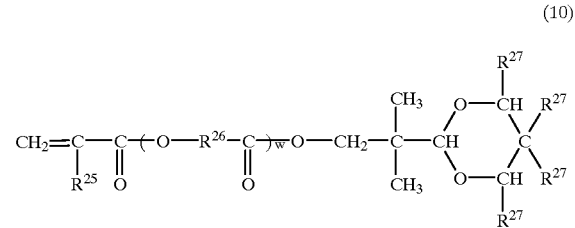

(10)

wherein $R^{25}$ is a hydrogen atom or methyl group, $R^{26}$ is an alkylene group having 2–8 carbon atoms, $R^{27}$ is a hydrogen atom or methyl group, w is an integer from 1 to 8; (14) (meth)acrylamide groups such as acryloyl morpholine, diacetone (meth) acrylamide, isobutoxymethyl (meth) acrylamide, dimethylaminoethyl (meth)acrylamide, diethylaminoethyl (meth)acrylamide, dimethylaminopropyl (meth)acrylamide, tert-octyl (meth)acrylamide, 7-amino-3, 7-dimethyloctyl (meth)acrylamide, N,N-dimethyl (meth) acrylamide, and N,N-diethyl (meth)acrylamide; (15) unsaturated carboxylate groups such as methy crotonate, ethyl crotonate, propyl crotonate, butyl crotonate, methyl cinnamate, ethyl cinnamate, propyl cinnamate, butyl cinnamate, dimethyl itaconate, diethyl itaconate, dimethyl maleate, diethyl maleate, dimethyl fumarate, and diethyl fumarate; (16) unsaturated nitrile groups such as (meth) acrylonitrile, α-chloro acrylonitrile, α-chloromethyl acrylonitrile, α-methoxy acrylonitrile, α-ethoxy acrylonitrile, crotonitrile, cinnamonitrile, itacondinitrile, maleindinitrile, and fumarodinitrile; (17) hydroxyl group-containing vinyl ether groups such as 2-hydroxyethyl vinyl ether, 2-hydroxypropyl vinyl ether, 3-hydroxypropyl vinyl ether, 3-hydroxybutyl vinyl ether, 4-hydroxybutyl vinyl ether, 5-hydroxypentyl vinyl ether, and 6-hydroxyhexyl vinyl ether; (18) hydroxyl group-containing allyl ethers such as 2-hydroxyethyl allyl ether, 4-hydroxybutyl allyl ether, and glycerol monoallyl ether; (19) monomers containing a hydroxyalkyl group such as allyl alcohol; (20) monomers containing an epoxy group such as vinyl glycidyl ether, allyl glycidyl ether, glycidyl (meth)acrylate, glycidyl crotonate, and methyl glycidyl maleate; and the like.

Among these, 2-hydroxyethyl vinyl ether and 2-hydroxybutyl vinyl ether are preferred. These compounds may be used either individually or in combinations of two or more.

Specific fluorine-containing polymers having functional groups can be obtained by the copolymerization of these monomers and the other monomers which contain functional groups such as isocyanate group.

In addition, if a monomer which contains a functional group such as a hydroxyl group or epoxy group is used as the component (b) in preparing the specific fluorine-containing polymers, it is possible to increase the strength of the cured coatings prepared from the resin composition used as coating material.

The proportion of the monomers containing a hydroxyl group or an epoxy group is from 0 to 30 mol %, preferably from 1 to 20 mol %, and more preferably from 3 to 15 mol %. If more than 30 mol %, the resulting curable resin composition may have impaired optical characteristics and may produce fragile cured coatings when used as a coating material.

Among the above-mentioned monomer compounds, alkyl vinyl ethers, cycloalkyl vinyl ethers, and carboxylic acid vinyl esters are preferably used to increase the yield in the polymerization reaction for preparing the specific fluorine-containing polymers.

On the other hand, the use of low molecular weight monomers such as methyl vinyl ether, ethyl vinyl ether, n-propyl vinyl ether, isopropyl vinyl ether, isobutyl vinyl ether, vinyl acetate, vinyl propionate, vinyl butyrate, and vinyl pivalate are preferable to increase the fluorine content in the specific fluorine-containing polymer.

The use of branched monomers such as isopropyl vinyl ether, isobutyl vinyl ether, tert-butyl vinyl ether, and vinyl pivalate, as well as alicyclic monomers such as cyclohexyl vinyl ether is effective to increase the hardness and decrease the index of refraction of the cured coating made from the resin composition.

The azo group-containing polysiloxane compound used as the component (c) is a compound having an azo group —N=N— which is easily cleaved by heat and a polysiloxane segment which is represented by the above-mentioned general formula (6). Such a compound can be prepared by a method disclosed in Japanese Patent Application Laid-open No. 93100/1994, for example.

As examples of the component(c), the compounds represented by the following general formula (11) can be given:

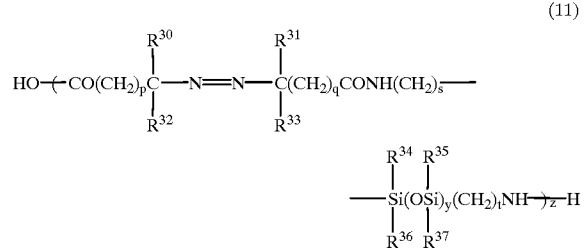

(11)

wherein $R^{30}$–$R^{33}$ may be the same or different and individually represent a hydrogen atom, alkyl group, or cyano group; $R^{34}$–$R^{37}$ may be the same or different and individually represent a hydrogen atom or alkyl group; p and q individually represent the number from 1 to 6; s and t represent the number from 0 to 6; y indicates the number from 1 to 500, preferably from 1 to 200; and z indicates the number from 1 to 50, preferably from 1 to 20.

The compound represented by the following general formula (12) can be given as a preferred example of these compounds:

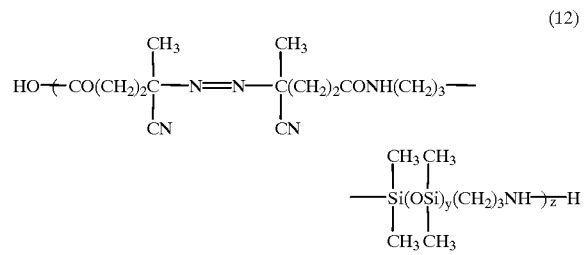

(12)

wherein y indicates the number from 1 to 500, preferably from 1 to 200, and z indicates the number from 1 to 50, preferably from 1 to 20.

As examples of commercially available products which can be used as the component (c), VPS-0501, VPS-1001 (manufactured by Wako Pure Chemicals Industries, Ltd.), and the like can be given.

As examples of preferred combinations of the component (a), component (b), and component (c), the following combinations can be given: (1) fluoro olefin/alkyl vinyl ether/polydimethylsiloxane compound, (2) fluoro olefin/perfluoro (alkyl vinyl ether)/alkyl vinyl ether/polydimethylsiloxane compound, (3) fluoro olefin/perfluoro(alkoxylalkyl) vinyl ether/alkyl vinyl ether/polydimethylsiloxane compound, (4) fluoro olefin/(perfluoro alkyl) vinyl ether/alkyl vinyl ether/polydimethylsiloxane compound, and (5) fluoro olefin/(perfluoro alkoxyl alkyl) vinyl ether/alkyl vinyl ether/polydimethylsiloxane compound.

The component (a) is used in such an amount that the proportion of the structural unit (a) in the resulting specific fluorine-containing polymer is in the range from 20 to 70 mol %, preferably from 25 to 65 mol %, and more preferably from 30 to 60 mol %.

The component (b) is used in such an amount that the proportion of the structural unit (b) in the resulting specific fluorine-containing polymer is in the range from 10 to 70 mol %, preferably from 15 to 65 mol %, and more preferably from 30 to 60 mol %.

The azo group-containing polysiloxane of the component (c) is a heat radical generating agent. This has a function as a polymerization initiator in the polymerization reaction to obtain the specific fluorine-containing polymer, and can be used together with other initiators.

The component (c) is used in such an amount that the proportion of the structural unit (c) (the proportion of the polysiloxane segment of the above-mentioned general formula (6)) in the resulting specific fluorine-containing polymer is in the range from 0.1 to 20 mol %, preferably from 0.1 to 15 mol %, more preferably from 0.1 to 10 mol %, most preferably from 0.1 to 5 mol %, and particularly preferably from 0.1 to 3 mol %.

In the present invention, it is desirable to use a reactive emulsifying agent which is the component (d) originating the structural unit (d), as a monomer component other than the components (a)–(c) mentioned above. The addition of the component (d) ensures the specific fluorine-containing polymer to exhibit excellent coatability and superior leveling characteristics when used as a coating material.

The use of nonionic reactive emulsifying agent as such a reactive emulsifying agent is particularly desirable. The compound represented by the following general formula (13), for example, can be given as a specific example of the nonionic reactive emulsifying agent:

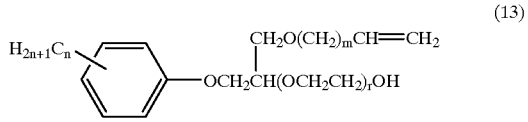

(13)

wherein m, and r represent the number of repeating units, with a preferable range being n=1–20, m=0–4, and r=3–50.

ADEKA REASOAP NE-5, ADEKA REASOAP NE-10, ADEKA REASOAP NE-20, ADEKA REASOAP NE-30, and ADEKA REASOAP NE-40 (manufactured by Asahi Denka Kogyo Co., Ltd.), and the like can be given as examples of commercially available products of the compounds used as the component (d).

The component (d) is used in such an amount that the proportion of the structural unit (d) in the resulting specific fluorine-containing polymer is in the range from 0.1 to 10 mol %, preferably from 0.1 to 5 mol %, more preferably from 0.1 to 3 mol %, and most preferably from 0.5 to 3 mol %.

Preferable combinations of the components when the component (d) is contained are as follows: (1) fluoroolefin/alkyl vinyl ether/polydimethylsiloxane compound/nonionic reactive emulsifying agent, (2) fluoroolefin/perfluoro(alkyl vinyl ether)/alkyl vinyl ether/polydimethylsiloxane compound/nonionic reactive emulsifying agent, (3) fluoroolefin/perfluoro(alkoxy alkyl) vinyl ether/alkyl vinyl ether/polydimethylsiloxane compound/nonionic reactive emulsifying agent, (4) fluoroolefin/(perfluoroalkyl) vinyl ether/alkyl vinyl ether/polydimethylsiloxane compound/nonionic reactive emulsifying agent, and (5) fluoroolefin/(perfluoroalkoxy alkyl) vinyl ether/alkyl vinyl ether/polydimethylsiloxane compound/nonionic reactive emulsifying agent.

The component (e) used in the preparation of the fluorine-containing polymer IY and fluorine-containing polymer IIY is a compound included in the azo group containing polysiloxane compound of the component (c).

Here, the compound represented by above-mentioned general formula (11) can be given as the compound used as the component (e), and the compounds represented by above-mentioned general formula (12) can be given as specific preferable examples. As examples of commercially available products which can be used as the component (e), VPS-0501, VPS-1001 (manufactured by Wako Pure Chemicals Industries, Ltd.), and the like can be given.

The component (e) is used in such an amount that the proportion of the structural unit (e) (the proportion as converted to —$(OSiR^{15}R^{17})_y$—) in the resulting specific fluorine-containing polymer is in the range from 0.1 to 10 mol %, preferably from 0.1 to 5 mol %, and more preferably from 0.1 to 3 mol %.

The emulsion polymerization, suspension polymerization, block polymerization, or solution polymerization using a radical polymerization initiator can be used as the polymerization method in the production of the specific fluorine-containing polymer of the present invention. A batch system, semi-continuous system, or continuous system operation may be suitably selected as the operating system of the polymerization reaction.

Given as examples of the radical polymerization initiator which can be used together with the component (c) are (1) diacyl peroxides such as acetyl peroxide and benzoyl peroxide, (2) ketone peroxides such as methyl ethyl ketone peroxide and cyclohexanone peroxide, (3) hydroperoxides such as hydrogen peroxide, tert-butyl hydroperoxide, and cumene hydroperoxide, (4) dialkyl peroxides such as di-tert-butyl peroxide, dicumyl peroxide, and dilauroyl peroxide, (5) peroxy esters such as tert-butyl peroxy acetate, and tert-butyl peroxy pivalate, (6) azo compounds such as azobisisobutyronitrile and azobisisovaleronitrile, and (7) persulfates such as ammonium persulfate, sodium persulfate, and potassium persulfate.

Given as specific examples of the above-mentioned radical polymerization initiators are iodine-containing fluorine compounds such as perfluoroethyl iodide, perfluoropropyl iodide, perfluorobutyl iodide, (perfluorobutyl)ethyl iodide, perfluorohexyl iodide, 2-(perfluorohexyl)ethyl iodide, perfluoroheptyl iodide, perfluorooctyl iodide, 2-(perfluorooctyl)ethyl iodide, perfluorodecyl iodide, 2-(perfluorodecyl)ethyl iodide, heptafluoro-2-iodine propane, perfluoro-3-methylbutyl iodide, perfluoro-5-methylhexyl iodide, 2-(perfluoro-5-methylhexyl)ethyl iodide, perfluoro-7-methyloctyl iodide, 2-(perfluoro-7-methyloctyl)ethyl iodide, perfluoro-9-methyldecyl iodide, 2-(perfluoro-9-methyldecyl)ethyl iodide, 2,2,3,3-tetrafluoropropyl iodide, 1H,1H,5H-octafluoropentyl iodide, 1H,1H,7H-dodecafluoroheptyl iodide, tetrafluoro-1,2-diiodo ethane, octafluoro-1,4-diiodo butane, dodecafluoro-1,6-diiodo hexane, and the like.

The iodine-containing fluorine compounds can be used either singly or in combination with the above-mentioned organic peroxides, azo compounds, or persulfates. In addition, an inorganic reducing agent such as sodium hydrogensulfite and sodium pyrosulfite, or an organic reducing agent such as cobalt naphthenate and dimethylaniline can be used jointly with the above-mentioned radical polymerization initiators if necessary.

Dilauroyl peroxide is particularly preferable among these radical polymerization initiators which can be used together with the component (c).

The polymerization reaction to produce the specific fluorine-containing polymer is preferably carried out by the solvent polymerization system using a solvent. Here, given as examples of the preferable organic solvents are (1) esters such as ethyl acetate, butyl acetate, isopropyl acetate, isobutyl acetate, and cellosolve acetate, (2) ketones such as acetone, methyl ethyl ketone, methyl isobutyl ketone, and cyclohexanone, (3) cyclic ethers such as tetrahydrofuran and dioxane, (4) amides such as N,N-dimethylformamide and N,N-dimethylacetamide, (5) aromatic hydrocarbons such as toluene and xylene, and the like. In addition, alcohols, aliphatic hydrocarbons, and the like can also be mixed with the above organic solvents as required.

Of the above solvents, ethyl acetate, methyl isobutyl ketone, and the like are preferred because of their excellent capability of dissolving the various components.

In the polymerization reaction to prepare the specific fluorine-containing polymer, the above-mentioned component (a), component (b), and component (c) or the components (e) and (d) which are the components of subordinate category of the component(c), the polymerization initiators, solvents, and other additives are usually charged altogether and reacted.

The amount of the polymerization initiator is usually from 0.1 to 5 mol % of the total amount of the monomers. The reaction is carried out at a temperature from 50 to 90° C. for 10 to 30 hours.

The reaction solution of the specific fluorine-containing polymer thus prepared may be used as is or the polymerization reaction solution maybe subjected to a suitable post treatment before used as a curable resin composition.

A common re-precipitation process which is a typical purification method comprising the dropwise addition of the polymerization reaction solution to an insolubilizing solvent such as alcohol to precipitate the specific fluorine-containing polymer can be used as the post-treatment process. The resulting solid copolymer is re-dissolved in a solvent to obtain a solution of the specific fluorine-containing polymer.

The product obtained by removing residual monomers from the polymerization reaction solution can also be used as a solution of the specific fluorine-containing polymer.

<Modified Specific Fluorine-containing Polymer>

The specific fluorine-containing polymer used in the composition of the present invention may be a modified copolymer in which a cross-linking functional group or a photopolymerizable group has been introduced (such a modified copolymer is hereinafter called respectively "cross-linking functional group-containing copolymer" or "photopolymerizable group-containing copolymer").

(1) Cross-linking Functional Group-containing Copolymer

The cross-linking functional group-containing copolymer can be obtained by using a copolymerizable monomer which contains a cross-linking functional group as the component (b)

A hydroxyl group, carboxyl group, dicarboxylic acid anhydride group, epoxy group, amino group, hydrolyzable silyl group, silanol group, isocyanate group, thiol group, and the like can be given as examples of the cross-linking functional group.

Given as specific examples of the copolymerizable monomer having a cross-linking functional group are monomers containing a hydroxyl group such as hydroxyethyl vinyl ether, hydroxybutyl vinyl ether, and hydroxyethyl (meth)acrylate; monomers containing carboxyl group such as vinyl acetate, crotonic acid, cinnamic acid, maleic acid, fumaric acid, itaconic acid, citraconic acid, and (meth)acrylic acid; monomers containing a dicarboxylic acid anhydride group such as maleic anhydride and phthalic anhydride, the monomer containing an epoxy group such as vinyl glycidyl ether, allyl glycidyl ether, glycidyl (meth)acrylate, crotonic acid glycidyl ester, and maleic acid methyl glycidyl ester; and monomers containing a hydrolyzable silyl group such as vinyl trimethoxysilane The composition of the present invention prepared by using a cross-linking functional group-containing polymer as the specific fluorine-containing polymer and adding a crosslinking compound which is described later can introduce a cross-linking structure in the cured coating formed from the composition, so that the cured coating has a high hardness and superior resistance to solvents and chemicals.

Preferable combinations of the component(a), component (b), and component(c) or the components (e) and (d) which are the components of subordinate category of the component(c), in the preparation of cross-linking functional group-containing copolymer are as follows: (1) fluoroolefin/alkyl vinyl ether/hydroxyl group or epoxy group-containing vinyl ether/polydimethylsiloxane compound/nonionic reactive emulsifying agent, (2) fluoroolefin/perfluoro(alkyl vinyl ether)/alkyl vinyl ether/hydroxyl group or epoxy group-containing vinyl ether/polydimethylsiloxane compound/nonionic reactive emulsifying agent, (3) fluoroolefin/perfluoro(alkoxyalkyl) vinyl ether/alkyl vinyl ether/hydroxyl group or epoxy group-containing vinyl ether/polydimethylsiloxane compound/nonionic reactive emulsifying agent, (4) fluoroolefin/(perfluoroalkyl) vinyl ether/alkyl vinyl ether/hydroxyl group or epoxy group-containing vinyl ether/polydimethylsiloxane compound/nonionic reactive emulsifying agent, and (5) fluoroolefin/(perfluoroalkoxy alkyl) vinyl ether/alkyl vinyl ether/hydroxyl group or epoxy group-containing vinyl ether/polydimethylsiloxane compound/nonionic reactive emulsifying agent.

(2) Photopolymerizable Group-containing Copolymer

The photopolymerizable group-containing copolymer can be obtained by reacting said cross-linking functional group-containing copolymer with a compound having a photopolymerizable group which is reactive with the cross-linking functional group, thereby introducing the photopolymerizable group.

Given as examples of the photopolymerizable groups are (meth)acryloyl group, alkenyl group, cinnamoyl group, cinnamylidene acetyl group, benzal acetophenone group, styryl pyridine group, α-phenyl maleimide group, phenyl azide group, sulfonyl azide group, carbonyl azide group, diazo group, o-quinone diazido group, furyl acryloyl group, cumarin group, pyrone group, anthracene group, benzophenone group, stilbene group, dithiocarbamate group, xanthate group, 1,2,3-thiadiazole group, cyclopropene group, azadioxabicyclo group, and the like. Either one of these groups or two or more of these groups may be present in the photopolymerizable group-containing copolymer. Of these, (meth)acryloyl group and cinnamoyl group are preferred, with the (meth)acryloyl group being particularly preferred.

The method to prepare the photopolymerizable group-containing copolymer includes, but not limited to, the following methods.

① A method of esterifying the cross-linking functional group-containing copolymer having a hydroxyl group by reacting with (meth)acrylic acid chloride.

② A method of urethanizing the cross-linking functional group-containing copolymer having a hydroxyl group by reacting with a (meth)acrylate having an isocyanate group.

③ A method of esterifying the cross-linking functional group-containing copolymer having an epoxy group by reacting with (meth)acrylic acid.

④ A method of esterifying the cross-linking functional group-containing copolymer having a carboxyl group by reacting with a (meth)acrylate having an epoxy group.

The composition of the present invention prepared by using a photopolymerizable group-containing polymer as the specific fluorine polymer induces the photopolymerization reaction of a reactive diluent, as well as the photopolymerization reaction of the specific fluorine polymer, when the coating made from this composition is irradiated with radioactive rays. As a result, a cured coating with a crosslinking structure introduced therein exhibits high hardness and superior resistance to solvents and chemicals.

<Curable Resin Composition>

The resin composition of the present invention is a composition containing the specific fluorine-containing polymer.

This curable resin composition of the present invention must be curable by itself. If the specific fluorine-containing polymer does not exhibit sufficient curablility, a crosslinking compound is incorporated to provide the required curability or improve the curability.

When the crosslinking compound is used, the curable resin composition may be either a mixture of such a crosslinking compound and the specific fluorine-containing polymer, or a complete or partial reactant of the specific fluorine-containing polymer and the crosslinking compound.

<Crosslinking Compound>

Various amino compounds and various hydroxyl group-containing compounds such as pentaerythritol, polyphenol, glycol, and the like can be given as examples of the crosslinking compounds.

The amino compound used as the crosslinking compound is a compound having at least two amino groups which are reactive with the hydroxyl group or epoxy group possessed by the fluorine-containing polymer (cross-linking functional group-containing copolymer). All of the two or more amino groups may be either hydroxyalkyl amino groups or alkoxyalkyl amino groups or may consists of both the hydroxyalkyl amino groups and alkoxyalkyl amino groups. Specific examples are melamine compounds, urea compounds, benzoguanamine compounds, glycoluryl compounds, and the like.

Melamine compounds are known as the compounds having the skeleton in which a nitrogen atom is bonded to the triazine ring and include, for example, melamine, alkylated melamine, methylolated melamine, alkoxylated methyl melamine, and the like. The melamine compounds having at least two groups selected from methylol groups and alkoxylated methyl groups are preferred. Specifically, methylolated melamine obtained by reacting melamine and formaldehyde under basic conditions, alkoxylated methyl melamines, and their derivatives are desirable. Alkoxylated methyl melamines are particularly preferred to ensure excellent storage stability of the resulting curable resin composition and superior reactivity.

There are no specific limitations to the methylolated melamines and alkoxylated methyl melamines used as a crosslinking compound. Various resinous materials obtained by a process described in the textbook entitled "Plastic Material Lecture Vol. 8, Urea-Melamine Resin" (Nikkan Kogyo Shinbun), for example, can be used.

As urea compounds, polymethylolated urea and its derivative alkoxylated methylurea, methylolated urone and alkoxylated methyl urone having a uronic ring, and the like can be mentioned in addition to urea. The urea derivatives produced as various resinous materials according to the methods described in the above-mentioned textbook can be used.

The amount of the crosslinking compound used is usually in the range from 1 to 150 parts by weight, preferably from 3 to 70 parts by weight, and more preferably from 5 to 50 parts by weight, for 100 parts by weight of the specific fluorine-containing polymer. If the amount of the crosslinking compound is too small, the durability of thin coatings formed from the resulting curable resin composition may be insufficient. If more than 150 parts by weight, not only it is difficult to avoid gelling in the reaction with the specific fluorine-containing polymer, but also it is difficult to obtain cured coatings with a sufficiently low refractive index. In addition, the cured products may be fragile.

The reaction of the specific fluorine-containing polymer and crosslinking compound can be carried out, for example, by adding the crosslinking compound to a solution of the specific fluorine-containing polymer dissolved in an organic solvent, and heating the mixture for an appropriate period of time, while homogenizing the mixture by any suitable means such as stirring. The temperature of this reaction may be in the range from 30 to 150° C., preferably from 50 to 120° C. If the temperature is lower than 30° C., the reaction is difficult to proceed; if higher than 150° C., crosslinking reactions among the methylol groups and alkoxylated methyl groups of the crosslinking compound may occur in addition to the intended reaction, which may result in gel formation.

The degree of reaction can be quantitatively confirmed by infrared spectroscopic analysis of the methylol group or alkoxylated methyl group or by a method of collecting dissolved polymers by re-precipitation and measuring the amount of the polymer increased.

The reaction of the specific fluorine-containing polymer and the crosslinking compound is preferably carried out using an organic solvent, for example, the same organic solvent as used in the production of the specific fluorine-containing polymer.

In the present invention, such a reaction solution obtained from the specific fluorine-containing polymer and the crosslinking compound can be used as a curable resin composition as is, or after the addition of various optional additives at needed.

<Additives>

The curable resin composition of the present invention may contain various additives to improve coatability and properties of thin coatings produced by the application of said curable resin composition, and to provide improved photosensitivity to the coatings. Such additives may include, for example, various polymers and monomers having a hydroxyl group, coloring agents such as a pigment or dye, stabilizers such as aging preventives and UV absorbers, heat sensitive acid generators, photosensitive acid generators, surfactants, solvents, and polymerization inhibitors.

The addition of heat sensitive acid generators or photosensitive acid generators is particularly desirable to improve hardness and durability of the cured coatings. Those which can prevent decrease in the transparency of the cured coatings and can be homogeneously dissolved in a solution should be selected.

<Polymers Having a Hydroxyl Group>

As examples of the polymers having a hydroxyl group which can be incorporated in the curable resin composition of the present invention, polymers obtained by the copolymerization of hydroxyl group-containing copolymerizable monomers such as hydroxyethyl (meth)acrylate, polyvinyl alcohol, ethylene/vinyl alcohol copolymer, polyvinyl butyral, and known phenol skeleton-containing resins such as novolak resins or resol resins can be given.

<Coloring Agents Such as Pigments or Dyes>

The following coloring agents can be given as examples of the coloring agents which can be incorporated in the curable resin composition of the present invention: (1) extenders such as alumina white, clay, barium carbonate, and barium sulfate, (2) inorganic pigments such as zinc white, white lead, chrome yellow, red lead, ultramarine blue pigment, iron blue pigment, titanium oxide, zinc chromate, red iron oxide, and carbon black, (3) organic pigments such as Brilliant Carmin 6B, Permanent Red 6B, Permanent Red R, benzidine yellow, phthalocyanine blue, and phthalocyanine green, (4) basic dyes such as magenta and rhodamine, (5) substantive dyes such as direct scarlet and direct orange, (6) acidic dyes such as Roserine and metanil yellow, and the like.

<Stabilizers Such as Aging Preventives and UV Absorbers>

Commonly known aging preventives and UV absorbers can be used in the curable resin composition of the present invention.

Given as specific examples of the aging preventives are di-tert-butylphenol, pyrogallol, benzoquinone, hydroquinone, Methylene Blue, tert-butyl catechol, monobenzyl ether, methyl hydroquinone, amyl quinone, amyloxyhydroquinone, n-butyl phenol, phenol, hydroquinone monopropyl ether, 4,4'-[1-[4-(1-(4-hydroxyphenyl)-1-methylethyl)phenyl]ethylidene]diphenol, 1,1,3-tris(2,5-dimethyl-4-hydroxyphenyl)-3-phenyl propane, diphenylamines, phenylenediamines, phenothiazine, and mercaptobenzimidazole.

Various UV absorbers commonly used as additives for plastics such as, for example, salicylic acid-type UV absorbers typified by phenyl salicylate, benzophenone-type UV absorbers, such as dihydroxy benzophenone, and 2-hydroxy-4-methoxybenzophenone, benzotriazole-type UV absorbers, and cyanoacrylate-type UV absorbers can be used in the curable resin composition of the present invention.

<Heat Sensitive Acid Generators>

The heat sensitive acid generator which may be used in the curable resin composition of the present invention should be a compound which can make the heating conditions mild when coatings of the composition and the like are cured by heating.

As specific examples of such a heat sensitive acid generator, various aliphatic sulfonic acids and their salts; various aliphatic carboxylic acids such as citric acid, acetic acid, and maleic acid, and their salts; various aromatic carboxylic acids such as benzoic acid and phthalic acid, and their salts; alkylbenzene sulfonic acid and the ammonium salt thereof, various metal salts, phosphoric acid and phosphate of an organic acid; and the like can be given.

The amount of the heat sensitive acid generator used in the curable resin composition is in the range from 0 to 10 parts by weight, and preferably from 0.1 to 5 parts by weight, for 100 parts by weight of the specific fluorine-containing polymer. If the proportion of the heat sensitive acid generator is too great, storage stability of the curable composition may be inferior, undesirably.

<Photosensitive Acid Generators>

The photosensitive acid generator which may be incorporated in the curable resin composition of the present invention should be a compound capable of imparting photosensitivity of the coating made from the curable resin composition, ensuring the coatings to cure upon irradiation with radioactive rays, for example.

Given as examples of such a photosensitive acid generator are (1) various onium salts such as iodonium salts, sulfonium salts, phosphonium salts, diazonium salts, ammonium salts, and pyridinium salts, (2) sulfone compounds such as β-keto esters, β-sulfonyl sulfones, and α-diazo compounds of these, (3) sulfonates such as alkyl sulfonates, haloalkyl sulfonates, aryl sulfonates, and imino sulfonates, (4) sulfonimide compounds represented by the following general formula (14):

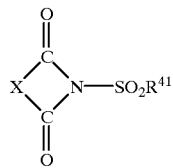

(14)

wherein X is a divalent group such as an alkylene group, arylene group, and alkoxylene group, and $R^{41}$ represents a monovalent group such as an alkyl group, aryl group, halogen-substituted alkyl group, halogen-substituted aryl group, and (5) diazomethane compounds shown by the following general formula (15);

(15)

wherein $R^{42}$ and $R^{43}$ may be the same or different and individually represent a monovalent group such as an alkyl group, aryl group, halogen-substituted alkyl group, and halogen-substituted aryl group.

These photosensitive acid generators may be used either individually or in combinations of two or more, or can be used together with the above-mentioned heat sensitive acid generators.

The amount of the photosensitive acid generators used in the curable resin composition is in the range from 0 to 20 parts by weight, and preferably from 0.1 to 10 parts by weight, for 100 parts by weight of the specific fluorine-containing polymer. If the proportion of the photosensitive acid generator is too large, the strength and transparency of the cured coatings may be impaired.

<Polymerization Inhibitors>

Given as examples of thermal polymerization inhibitors which can be incorporated in the curable resin composition of the present invention are pyrogallol, benzoquinone, hydroquinone, Methylene Blue, tert-butyl catechol, monobenzyl ether, methyl hydroquinone, amyl quinone, amyloxy hydroquinone, n-butyl phenol, phenol, hydroquinone monopropyl ether, 4,4,'-[1-[4-(1-(4-hydroxyphenyl)-1-methylethyl)phenyl]ethylidene]diphenol, 1,1,3-tris(2,5-dimethyl-4-hydroxy phenyl)-3-phenylpropane, and the like.

The thermal polymerization inhibitors are used in an amount of 5 parts by weight or less for 100 parts by weight of the curable resin composition.

<Surfactants>

Surfactants may be added to improve coatability of the curable resin composition of the present invention. Commonly known surfactants such as, for example, various anion-type surfactants, cation-type surfactants, and nonionic surfactants can be used. Fluorine-containing surfactants are particularly preferable to improve strength and optical characteristics of the cured coatings.

The surfactants are used in an amount of 5 parts by weight or less for 100 parts by weight of the curable resin composition.

<Solvents>

The curable resin composition of the present invention usually includes a solvent as an indispensable component. The curable resin composition is obtained in a form of a solution typically comprising the solvent used for the production of the specific fluorine-containing polymer or the solvent used for the reaction of the specific fluorine-containing polymer and the crosslinking compound. The solvent is therefore inherently included. In addition, the solvent may be separately added to improve coatability and the like of the curable resin composition.

Ketones such as methyl ethyl ketone, methyl isobutyl ketone, and cyclohexanone, and esters such as ethyl acetate, and butyl acetate can be given as examples of the solvent which is preferably used in the curable resin composition of the present invention.

In addition, a solvent which can not dissolve the specific fluorine-containing polymer, for example, a poor solvent such as water, alcohols, or ethers, can be used jointly to the extent that the specific fluorine-containing polymer does not precipitate. This may ensure superior storage stability and coatability of the solution of said specific fluorine-containing polymer. Given as examples of such a poor solvent are ethyl alcohol, isopropyl alcohol, tert-butyl alcohol, and the like.

<Suitable Curable Resin Composition>

The curable resin composition of the present invention preferably comprises: the specific fluorine-containing polymer of the olefin polymer of the present invention (hereinafter referred to as component (A)), a polyfunctional (meth) acrylate compound comprising at least two (meth) acryloyl groups in the molecule (hereinafter referred to as component (B)), and a radiation-active initiator (hereinafter referred to as component (C)).

In the curable resin composition of the present invention which comprises the components (A), (B), and (C) (hereinafter referred to as the Resin Composition (II)), the component (A) is used in the amount preferably from 1 to 80 wt %, and more preferably from 3 to 80 wt %, for 100 wt % of the total amount of the Resin Composition (II) (this is hereinafter referred to as "specific conditions"), to ensure high optical characteristics of the cured products, superior coatability of the composition, and adequate scratch resistance of the coatings.

The poly-functional (meth) acrylate compound which is the component (B) of the Resin Composition (II) is a compound having two or more, preferably from 3 to 10, more preferably from 3 to 6, (meth)acryloyl groups in the molecule.

Given as specific examples of such a compound are: (1) alkylene glycol di(meth)acrylates such as ethylene glycol di(meth)acrylate, diethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, and neopentyl glycol di(meth) acrylate, (2) poly(meth)acrylates of polyhydric alcohol such as trimethylolpropane tri(meth)acrylate, trimethylolpropane trihydroxyethyl tri(meth)acrylate, ditrimethylolpropane tetra(meth)acrylate, pentaerythritol tri(meth)acrylate, pentaerythritol tetra(meth)acrylate, dipentaerythritol hexa (meth) acrylate, and hydroxypivalic acid neopentyl glycol di (meth) acrylate, (3) poly (meth) acrylates of isocyanurate such as isocyanurate tri(meth)acrylate, tris(2-hydroxyethyl) isocyanurate di(meth)acrylate, and tris(2-hydroxyethyl) isocyanurate tri(meth)acrylate, (4) poly (meth) acrylates of cyclo alkane such as tricyclodecanediyl dimethyl di(meth) acrylate, (5) (meth)acrylate derivatives of bisphenol A such as di(meth)acrylate of ethylene oxide adduct of bisphenol A, di(meth)acrylate of propylene oxide adduct of bisphenol A, di(meth)acrylate of alkylene oxide adduct of bisphenol A, di(meth)acrylate of ethylene oxide adduct of hydrogenated bisphenol A, di(meth) acrylate of propylene oxide adduct of hydrogenated bisphenol A, di(meth)acrylate of alkylene oxide adduct of hydrogenated bisphenol A, and (meth) acrylate obtained from bisphenol A diglycidyl ether and (meth)acrylic acid, (6) fluorine-containing (meth)acrylates such as 3,3,4,4,5,5,6,6-octafluorooctane di(meth)acrylate, 3-(2-perfluorohexyl) ethoxy-1,2-di(meth)acryloyl propane, and N-n-propyl-N-2,3-di(meth) acryloylpropylperfluorooctyl sulfonamide. These compounds may be used either individually or in combinations of two or more. Of these, dipentaerythritol hexacrylate, pentaerythritol tetraacrylate, pentaerythritol triacylate, and trimethylolpropane triacrylate are particularly preferred.

The proportion of the component (B) under the specific conditions is preferably in the range from 10 to 70 wt %, more preferably from 20 to 60 wt %. Hardness and scratch resistance of the cured products may be inadequate if the proportion of the component (B) is less than 10 wt %. If more than 70 wt %, the refractive index of the composition may become so high that the antireflection effect may be insufficient.

Given as specific examples of the radiation-active initiator used as the component (C) in the Resin Composition (II) are 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl methyl ketal, 1-(4-isopropylphenyl)-2-hydroxy-2-methylpropan-1-one, 2- hydroxy-2-methyl-1-phenylpropan-1-one, thioxanethone, diethylthioxanthone, 2-isopropylthioxanthone, 2-chlorothioxanthone, 2-methyl-1-[4-(methylthio)phenyl]-2-morpholino-propan-1-one, 2,4,6-trimethylbenzoyl diphenylphosphine oxide, 2-benzyl-2-dimethylamino-1-(4-morpholinophenyl)butan-1-one, and 1-[4-(2-hydroxyethoxy)-phenyl]-2-hydroxy-2-methyl-1-propan-1-one. These compounds may be used either individually or in combinations of two or more.

Of these compounds, 2-methyl-1-[4-(methylthio)phenyl]-2-morpholino-propan-1-one, diethylthioxanthone, and the like are desirable.

The component (C) is incorporated to improve curability of the Resin Composition (II). Because the addition of an excess amount of the component (C) is not only uneconomical, but also renders the cured products fragile, the preferable proportion of the component (C) under the specific conditions is in the range from 0.1 to 10 wt %, and particularly from 0.2 to 5 wt %.

In addition to the above-mentioned component (A), component (B), and component (C), a compound having one unsaturated group in the molecule (other than the compounds included in the components (A), (B), and (C)) can be incorporated in the Resin Composition (II) of the present invention as the component (D) to further improve various characteristics of the cured products.

The use of a compound possessing a functional group as the component (D) is particularly preferable to increase adhesion of the composition to substrates.

As the component (D), the compounds having one (meth) acryloyl group in the molecule and the other polymerizable monomers which are copolymerizable with the component (B) can be given.

As specific examples of the component (D), the compounds previously described as the component (a) and the component (b) as the components for the above-mentioned specific fluorine-containing polymer (A), can be given. The other compounds which can be used as the component (D) include fluorine-containing (meth)acrylic acid esters such as 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, and 2-(perfluorodecyl)ethyl (meth)acrylate. These copolymerizable monomers may be used either individually or in combinations of two or more.

In addition, it is desirable to add a fluorine-containing (meth)acrylates to ensure a low refractive index of the cured products, and to add N-vinyl lactams to improve the mutual solubility of all components in the composition and to increase adhesion of the coatings to substrates. As specific examples of such compounds, heptadecafluorodecyl (meth) acrylate, octafluoropentyl (meth)acrylate, tetrafluoro propyl (meth)acrylate, trifluoroethyl (meth)acrylate, N-vinyl-2-pyrrolidone, N-vinyl-2-caprolactam, and the like can be given.

The component (D) is incorporated in an amount from 0 to 20 wt %, preferably from 0 to 10 wt % under the specific conditions. Hardness of the cured coating tends to decrease if the proportion of component (D) is excessive. It is desirable that the total amount of the component (B) and the component (D) under the specific conditions be in the range from 20 to 80 wt %.

The Resin Composition (II) of the present invention can be prepared by homogenizing the specific fluorine-containing polymers, polymerizable monomers, and radiation-active initiators in the presence of an organic solvent by stirring. The Resin Composition (II) of the present invention thus prepared can be used as is, or after incorporating various optional additives.

To ensure formation of uniform coatings which excellently adhere to substrates, it is desirable to add a polymer containing fluorine atoms other than the specific fluorine-containing polymers (such a polymer hereinafter may be simply referred to as "fluorine-containing polymer") to the Resin Composition (II) of the present invention.

The fluorine-containing polymer can be obtained by polymerizing the same fluorine-containing olefin compound as used for the component (a) which constitutes the specific fluorine-containing polymer solely in the presence of a radical polymerization initiator or, as required, by copolymerizing the same fluorine-containing olefin compound as used for the component (b) and/or the same reactive emulsifying agent as used for the component (d).

The following combinations can be given as particularly preferred concrete examples: (1) copolymer of vinylidene fluoride/tetrafluoro ethylene/hexafluoro ethylene, (2) fluoroolefin/alkyl vinyl ether, (3) fluoroolefin/perfluoro (alkyl vinyl ether)/alkyl vinyl ether, (4) fluoroolefin/ perfluoro(alkoxy alkyl)vinyl ether/alkyl vinyl ether, (5) fluoroolefin/(perfluoroalkyl) vinyl ether/alkyl vinyl ether, and (6) fluoroolefin/(perfluoroalkoxy alkyl) vinyl ether/alkyl vinyl ether.

The composition (1) above is a particularly preferred example owing to its excellent mutual solubility with the component (B) and solvents and also owing to its high scratch resistance. The compositions (2) to (6) are examples with which various functional groups are incorporated in the polymer to improve adhesion to substrates.

KYNAR ADS (manufactured by Elf Atochem) can be given as commercially available products of the compound which can be used as the above composition (1).

The above-described various additives, i.e. coloring agents such as pigments or dyes, stabilizers such as aging preventives and UV absorbers, crosslinking compounds, heat sensitive acid generators, photosensitive acid generators, surfactants, solvents, polymerization inhibitors, and the like can be added to the Resin Composition (II) of the present invention to improve coatability of the composition, various characteristics of thin coatings after cure, photosensitivity of coatings, and the like.

Moreover, it is desirable to add the above-mentioned crosslinking compounds to the Resin Composition (II) to improve hardness and durability of the cured coatings.

The additives and crosslinking compounds which can effectively prevent a decrease in the transparency after cure of the curable resin composition and can be homogeneously dissolved in a solution should be selected.

<Method for Forming Coatings>

The curable resin composition of the present invention can be coated onto various substrates in the form of a solution. Particularly, an excellent antireflection coating can be formed when the substrate is transparent.

Here, as examples of the transparent substrates, various transparent plastic plates and films, such as plates and films of polyester resin, polycarbonate resin, acrylic resin, styryl resin, allylate resin, norbornane resin, triacetyl cellulose, and the like can be given, in addition to inorganic glass.

As the coating method, various known methods such as a coater method, dipping method, and printing method can be employed.

To ensure durability of the cured coating which is a feature of the present invention, it is desirable to irradiate the coatings with ultraviolet rays to cure the resin in an inert gas atmosphere.

In addition, to form cured coatings with superior optical characteristics and excellent durability, it is desirable to give a heat history to the coatings made from the curable resin composition by heating. Although the curing reaction may proceed and the target cured coatings can be obtained when the coatings are allowed to stand at ordinary temperatures, curing with heating is more effective in practice to shorten the time required.

Moreover, the curing reaction can be further accelerated by previously adding a heat sensitive acid generator as a curing catalyst. There are no specific limitations to the curing catalyst. The above-mentioned various acids and salts which are used as common curing agents for urea resins, melamine resins, and the like can be used, with ammonium salts being particularly preferred.

Although the heating conditions for the curing reaction can be suitably selected, the heating temperature must be lower than the heat resistant limit temperature of the substrate on which the resin composition is coated.

The present invention will now be described by way of examples which are not intended to limit the present invention. In the examples below, "parts" and "%" respectively indicate "parts by weight" and "wt %", unless otherwise indicated.

EXAMPLES

Preparation Example 1

<Preparation of Specific Fluorine-containing Polymer>

The internal atmosphere of a 2.0 l autoclave made of stainless steel and equipped with a magnetic stirrer was thoroughly replaced by nitrogen gas. The autoclave was charged with 500 g of ethyl acetate as a solvent, 53.2 g of perfluoro(propyl vinyl ether) (FPVE) as the component (a), 48.7 g of ethyl vinyl ether (EVE) and 26.4 g of hydroxy butyl vinyl ether (HBVE) as the components (b), 20.0 g of ADEKA REASOAP NE-30 (manufactured by Asahi Denka Kogyo Co., Ltd.) as the nonionic reactive emulsifying agent of component (d), 3.0 g of an azo group-containing polydimethylsiloxane VPS-1001 (manufactured by Wako Pure Chemicals Industries, Ltd.) which is the component (c) and, at the same time, the component (e), and 1.0 g of dilauroyl peroxide (LPO) as a polymerization initiator. After cooling to −50° C. by a dry ice-methanol freezing mixture, nitrogen gas was again introduced to remove oxygen.

Then, 120.0 g of hexafluoro propylene (HFP) which is the component (a) was added and the mixture was heated. When the temperature in the autoclave was 60° C., the pressure was 6.1 kgf/cm$^2$. The reaction was continued for 20 hours at 60° C. while stirring the mixture, until the pressure decreased to as low as 2.5 kgf/cm$^2$, whereupon the reaction was terminated by cooling the autoclave with water. When the reaction mixture was cooled to room temperature, unreacted monomers were removed and the autoclave was open to obtain a polymer solution. The resulting polymer solution was poured into methanol to cause the polymer to precipitate. The precipitate was washed with methanol and dried under vacuum at 50° C. to obtain 221 g of fluorine-containing copolymer A1. The amount of monomers to produce this fluorine-containing copolymer A1, yield, polymerization conversion rate, and solid content are shown in Table 1.

The polystyrene-reduced number average molecular weight of this fluorine-containing copolymer Al measured by gel permeation chromatography using a 0.5% solution of the polymer in tetrahydrofuran (THF) was 35,000.

The glass-transition temperature (Tg) was measured by differential scanning calorimetry (DSC), the fluorine content was measured by the Alizarin Complexone method, and the hydroxyl value was measured by the acetylation method using acetic anhydride. The NMR analyses ($^1$H-NMR and $^{13}$C-NMR) and elemental analysis were performed. The proportion of monomer components forming the fluorine-containing copolymer A1 was determined from the fluorine content, the hydroxyl value, and the inorganic silica component which was measured from the amount of the residue after burning at 600° C. Results are shown in Table 2.

The IR spectrum of the fluorine-containing copolymer A1 after drying is shown in FIG. 1.

Preparation Examples 2–7

Comparative Preparation Examples 1 and 2

The fluorine-containing copolymers A2–A7 and comparative copolymers B1 and B2 were prepared in the same manner as in Preparation Example 1, except for using monomers shown in Table 1. The proportion of each monomer component forming these copolymers and their properties are shown in Table 2.

TABLE 1

[Amount of monomers]

| | | Preparation Example | | | | | | | Comparative Preparation Example | |
|---|---|---|---|---|---|---|---|---|---|---|
| | | 1 | 2 | 3 | 4 | 5 | 6 | 7 | 1 | 2 |
| Component | Monomer (g) | A1 | A2 | A3 | A4 | A5 | A6 | A7 | B1 | B2 |
| (a) | HFP | 120.0 | 171.4 | 117.1 | 185.6 | 185.1 | 136.5 | 136.5 | 118.3 | |
| | CTFE | | | | | | | | | 146.6 |
| | FPVE | 53.2 | | 52.0 | | | 55.4 | 55.4 | 52.3 | |
| (b) | HBVE | 26.4 | 13.3 | | 13.0 | 13.0 | 12.0 | 12.0 | 22.3 | 34.5 |
| | GVE | | | 29.2 | | | | | | |
| | EVE | 48.7 | 65.9 | 49.3 | 65.5 | | 52.1 | 52.1 | 56.8 | |
| | iso-BVE | | | | | 64.5 | | | | 19.7 |
| | CHVE | | | | 22.8 | | 3.4 | 3.4 | | 72.3 |
| | VAc | | | | | | 15.2 | 15.2 | | |
| | VPi | | | | | 14.3 | | | | |
| (d) | NE-10 | | 19.0 | | | 10.0 | | | | |
| | NE-30 | 20.0 | | 20.0 | 10.0 | | 15.0 | 15.0 | | |
| (c) | VPS-0501 | | | 3.0 | | | | | | |
| ((e)) | VPS-1001 | 3.0 | 1.5 | | 2.0 | 1.0 | 0.5 | 5.0 | | |
| | Polymerization initiator LPO | 1.0 | 2.0 | 1.5 | 1.5 | 2.0 | 2.0 | 2.0 | 2.0 | 3.0 |
| | Yield (g) | 221 | 227 | 235 | 217 | 230 | 244 | 207 | 210 | 175 |
| | Conversion (%) | 81 | 84 | 87 | 73 | 80 | 81 | 76 | 84 | 64 |
| | Solid content (%) | 28.6 | 31.2 | 30.5 | 27.1 | 31.5 | 33.4 | 29.3 | 28.0 | 22.6 |

TABLE 2

[Copolymer composition]

| | | Preparation Example | | | | | | | Comparative Preparation Example | |
|---|---|---|---|---|---|---|---|---|---|---|
| | | 1 | 2 | 3 | 4 | 5 | 6 | 7 | 1 | 2 |
| Component | Monomer component (mol %) | A1 | A2 | A3 | A4 | A5 | A6 | A7 | B1 | B2 |
| (a) | HFP | 41.1 | 50.2 | 39.6 | 48.6 | 52.1 | 41.1 | 40.0 | 41.4 | |
| | CTFE | | | | | | | | | 52.1 |
| | FPVE | 10.0 | | 9.4 | | | 9.4 | 9.7 | 9.7 | |
| (b) | HBVE | 11.8 | 5.3 | | 4.4 | 6.9 | 4.6 | 5.1 | 8.7 | 12.4 |
| | GVE | | | 14.8 | | | | | | |
| | EVE | 33.9 | 42.1 | 32.8 | 38.1 | | 35.8 | 31.7 | 40.2 | |
| | iso-BVE | | | | | 33.2 | | | | 8.8 |
| | CHVE | | | | 7.0 | | 1.2 | 2.0 | | 26.7 |
| | VAc | | | | | | 6.6 | 8.0 | | |
| | VPi | | | | | 6.1 | | | | |
| (d) | NE-10 | | 1.2 | | | 0.7 | | | | |
| | NE-30 | 0.8 | | 0.6 | 0.5 | | 0.5 | 0.5 | | |
| | Structural unit derived from the component (c) (component (e)) (mol %) | 2.4 | 1.2 | 2.8 | 1.4 | 1.0 | 0.8 | 3.0 | 0 | 0 |
| | Number average molecular weight | 35000 | 33000 | 56000 | 28000 | 31000 | 26000 | 31000 | 45000 | 24000 |

TABLE 2-continued

[Copolymer composition]

| | | Preparation Example | | | | | | | Comparative Preparation Example | |
|---|---|---|---|---|---|---|---|---|---|---|
| | | 1 | 2 | 3 | 4 | 5 | 6 | 7 | 1 | 2 |
| Component | Monomer component (mol %) | A1 | A2 | A3 | A4 | A5 | A6 | A7 | B1 | B2 |
| Fluorine content (%) | | 49.7 | 48.2 | 47.0 | 45.5 | 46.5 | 51.0 | 50.3 | 50.7 | 26.0 |
| Hydroxyl value (mg KOH/g) | | 46 | 24 | 0 | 20 | 29 | 19 | 21 | 38 | 60 |
| Glass transition temperature (° C.) | | 24 | 28 | 25 | 35 | 27 | 31 | 29 | 20 | 39 |

The abbreviations in Table 1 and Table 2 have the following meanings.

Component(a)
HFP: hexafluoro propylene
CTFE: chlorotrifluoroethylene
FPVE: perfluoro(propyl vinyl ether)

Component (b)
HBVE: hydroxybutyl vinyl ether
GVE: glycidyl vinyl ether
EVE: ethyl vinyl ether
iso-BVE: isobutyl vinyl ether
CHVE: cyclohexyl vinyl ether
VAc: vinyl acetate
VPi: vinyl pivalate Component (c)
VPS-0501: Azo group-containing polydimethylsiloxane of the above-mentioned general formula (12) (y=60–80, z=6–8, the number average molecular weight: 30,000–40,000, the molecular weight of the polysiloxane segment: about 5,000, manufactured by Wako Pure Chemicals Industries, Ltd.)
VPS-1001: Azo group containing polydimethylsiloxane of the above-mentioned general formula (12) (y=120–150, z=7–10, the number average molecular weight: 70,000–90,000, the molecular weight of polysiloxane segment: about 10,000, manufactured by Wako Pure Chemicals Industries, Ltd.)
VPS-0501 and VPS-1001 are also commercially available products of the component (e). Accordingly, these are indicated as "component (c) (component (e))" in Table 2.

Component(d)
NE-10: Nonionic reactive emulsifying agent shown by the above-mentioned general formula (13) (n=9, m=1, and s=10, ADEKA REASOAP NE-10 manufactured by Asahi Denka Kogyo Co., Ltd.)
NE-30: Nonionic reactive emulsifying agent shown by the above-mentioned general formula (13) (n=9, m=1, and s=30, ADEKA REASOAP NE-30 manufactured by Asahi Denka Kogyo Co., Ltd.)

Thermopolymerization Initiator
LPO: dilauroyl peroxide

Example 1

<Preparation of Crosslinked Polymer>

As shown in Table 3, 100 g of the specific fluorine-containing polymer A1 prepared in Preparation Example 1, and 30 g of methoxylated methyl melamine which is a cross-linking compound, Cymel 303 (manufactured by Mitsui Cytech Co., Ltd.), were dissolved in 900 g of methyl isobutyl ketone (MIBK) as a solvent. The mixture was reacted for 5 hours while stirring at 100° C. After the reaction, the reaction product was cooled to room-temperature to obtain a solution of the crosslinked polymer which is the reaction product of the specific fluorine-containing polymer and the cross-linking compound.

This solution was then gradually poured into a surplus quantity of cold methanol while stirring to cause the crosslinked polymer to precipitate. The resulting crosslinked polymer was dissolved into MIBK and again precipitated from cold methanol.

Figure 2:
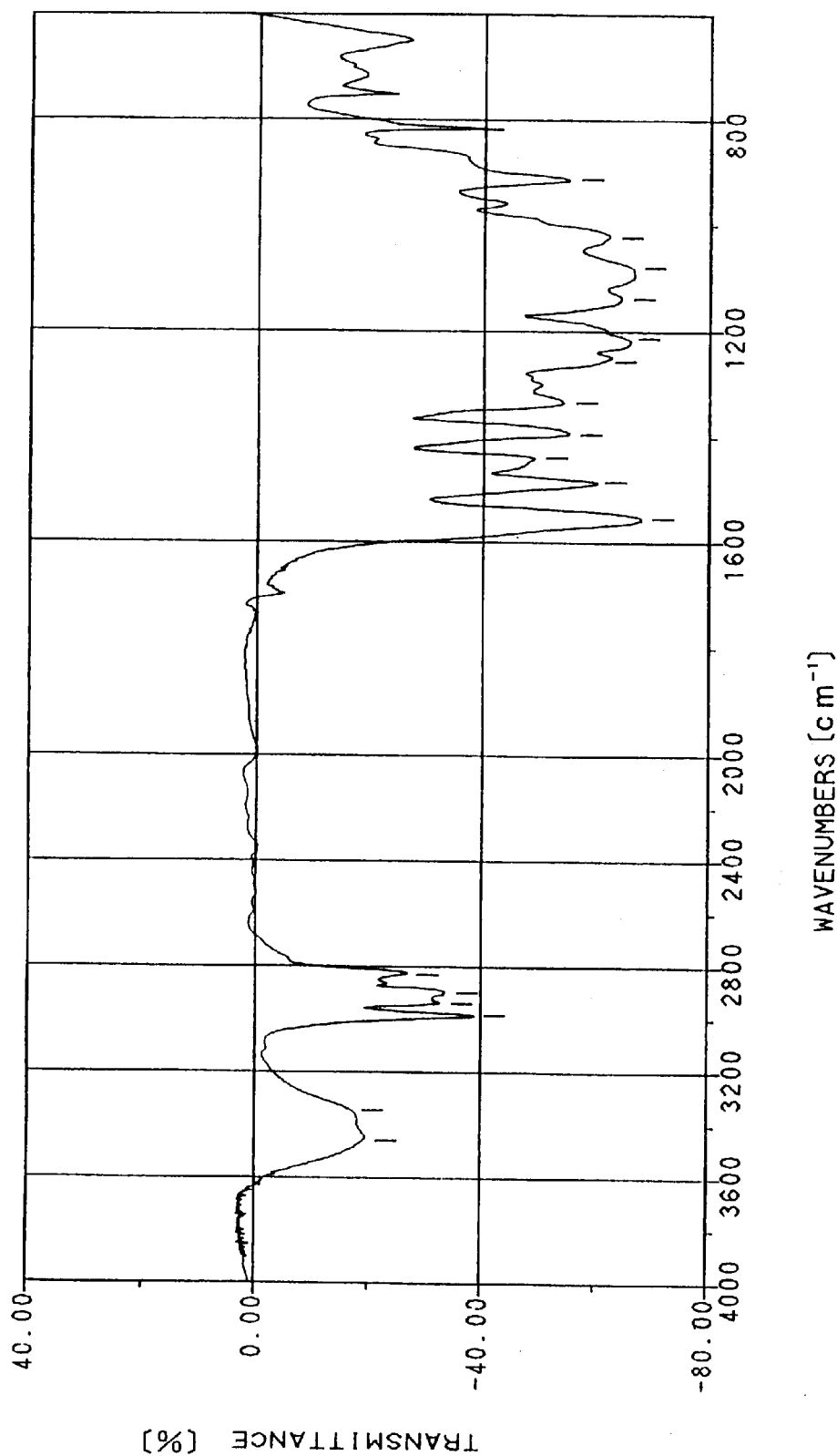
FIG. 2 is a chart showing the IR absorption spectrum of the crosslinked polymer prepared in Example 1.

The crosslinked polymer thus obtained was dried under vacuum. The IR spectrum of this crosslinked polymer after drying is shown in FIG. 2.

Preparation of Curable Resin Composition Solution>

As shown in Table 3, 100 g of the above-mentioned crosslinked polymer and 2 g of p-toluenesulfonic acid which is a curing catalyst were added to and dissolved in 900 g of MIBK to obtain a curable resin composition solution. This solution had a solid content of 10% and the viscosity of 30 cps or lower.

<Formation and Evaluation of Cured Coatings of the Curable Resin Composition>

(Measurement of Refractive Index)

The above-mentioned curable resin composition solution was applied onto a silicone wafer using a spin coater to produce a coating with a thickness of about 0.1 μm after drying. The refractive index ($n_D^{25}$) of the resulting coating was measured at 25° C. using an ellipsometer.

(Measurement of Transmittance)

A coating was formed from the curable resin composition solution by the casting method. A cured coating with a thickness of 200 μm was produced by heating at 120° C. for one hour. The light transmittance of the coating (hereinafter called "Sample 1") at a wavelength of 340–700 nm was measured.

<Measurement of Pencil Hardness>

The pencil hardness of the sample 1 was measured according to JIS K5400.

(Measurement of Total Light Transmittance and Reflectance)

A varnish with a solid content of 4% was prepared by diluting the above-mentioned curable resin composition solution with butanol. The varnish was coated onto a transparent polycarbonate plate with a thickness 3 mm by dipping the plate in and removing from the solution at a speed of 100 mm/minute. The resulting coating was heated for one hour at 120° C. to obtain a cured coating.

The thickness of the cured coating measured by ellipsometer was 1,140 Å.

The total light transmittance and reflectance of the polycarbonate plate on which the cured coating was formed (hereinafter called "Sample 2") were measured using a spectrophotometer, Type U-3410 (manufactured by Hitachi, Ltd.), with an integrating sphere with a diameter 60 mm.

(Scratch Resistance Test)

A scratch resistance test was carried out using the Sample 2, to evaluate adhesion to the substrate and strength of the cured coating. Specifically, the surface of the cured coating was repeatedly scratched 25 times at a load of 1 kg/cm² using Kimwipe (manufactured by Jujo Kimberley Co. Ltd.) to observe production of flaws on the surface of the cured coating by the naked eye. The samples with no flaws observed was rated "○", those with delamination or lines of flaws on the surface of cured coating was rated as "×". The results are shown in Table 4.

Examples 2–10 and

Comparative Examples 1–2

Crosslinked polymers were prepared in the same manner as in Example 1, except that the specific fluorine-containing polymers and crosslinking compounds shown in Table 3 were used. Curable resin compositions were prepared by adding the curing catalysts shown in Table 3 to the crosslinked polymers. Cured coatings were formed from these curable resin compositions by heating for 60 minutes at 120° C. Various properties of the coatings were measured. The results are shown in Table 4.

In Table 3, the amount of the curing catalyst indicates the amount (g) added to 100 g of the curable resin composition.

Cymel 238: An average 1.6 molecule oligomer produced by self-condensation of the compound represented by the following formula (ii):

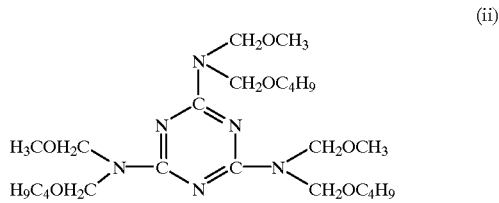

(ii)

Cymel 1170: An average 1.5 molecule oligomer produced by self-condensation of the compound represented by the following formula (iii):

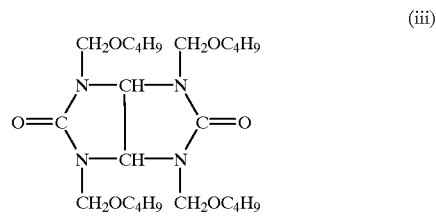

(iii)

TABLE 3

| | | Example | | | | | | | | | | Comparative Example | |
|---|---|---|---|---|---|---|---|---|---|---|---|---|---|
| | | 1 | 2 | 3 | 4 | 5 | 6 | 7 | 8 | 9 | 10 | 1 | 2 |
| Crosslinked polymer | Copolymer | A1 | A1 | A1 | A1 | A2 | A3 | A4 | A5 | A6 | A7 | B1 | B2 |
| | Solid content (g) | 100 | 100 | 100 | 100 | 100 | 100 | 100 | 100 | 100 | 100 | 100 | 100 |
| | Cymel 303 | 30 | | | | 10 | 20 | 20 | 20 | 20 | 20 | 20 | 20 |
| | Cymel 238 | | 20 | | | | | | | | | | |
| | Cymel 1170 | | | | 20 | | | | | | | | |
| | Mycoat 106 | | | 15 | | | | | | | | | |
| Curing catalyst | Kind | a | a | b | a | b | c | a | a | a | a | a | a |
| | Amount (g) | 2 | 2 | 2 | 2 | 2 | 1 | 1 | 2 | 2 | 2 | 2 | 2 |

Curing catalyst
a p-Toluenesulfonic acid
b Dodecylbenzenesulfonic acid
c Perfluorooctanoic acid The commercially available products in Table 3 are the following crosslinking compounds:

Cymel 303: An average 1.7 molecule oligomer produced by self-condensation of the compound represented by the following formula (i):

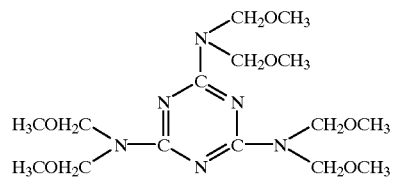

(i)

Mycoat 106: An average 1.7 molecule oligomer produced by self-condensation of the compound represented by the following formula (iv):

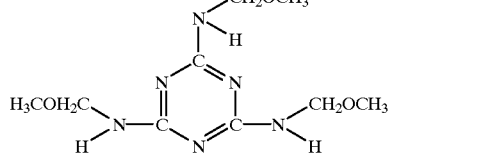

(iv)

TABLE 4

|  | Example | | | | | | | | | | Comparative Example | |
|---|---|---|---|---|---|---|---|---|---|---|---|---|
|  | 1 | 2 | 3 | 4 | 5 | 6 | 7 | 8 | 9 | 10 | 1 | 2 |
| Refractive index ($n_D^{25}$) | 1.39 | 1.38 | 1.38 | 1.38 | 1.37 | 1.38 | 1.38 | 1.38 | 1.38 | 1.38 | 1.38 | 1.46 |
| Sample 1  Light transmittance (%) | ≧90 | ≧90 | ≧90 | ≧90 | ≧90 | ≧90 | ≧90 | ≧90 | ≧90 | ≧90 | ≧90 | ≧90 |
| Pencil hardness | 2H | H | H | 2H | H | H | H | 2H | H | H | H | 2H |
| Sample 2  Total light transmittance (%) | 96 | 97 | 96 | 96 | 95 | 96 | 96 | 95 | 96 | 96 | 97 | 91 |
| Reflectance (%) | 1.9 | 1.7 | 1.8 | 1.8 | 1.7 | 1.8 | 1.8 | 1.8 | 1.9 | 1.8 | 1.8 | 5.2 |
| Scratch resistance | ○ | ○ | ○ | ○ | ○ | ○ | ○ | ○ | ○ | ○ | X | X |

*The light transmittance of 90% or more is indicated by "≧90" in the Table

It can be seen from the results of Table 4 that the curable resin composition of the Examples can form cured coatings having a low index of refraction, high light transmittance, superior strength, small reflectance, and excellent adhesion to substrates.

On the other hand, the composition containing no structural unit derived from the component (c) exhibited insufficient scratch resistance, even though the molecular weight of the polymer is approximately the same as those of the Examples.

Preparation Example 8
<Preparation of Specific Fluorine-containing Polymer>

The internal atmosphere of a 1.5 l autoclave made of stainless steel and equipped with a magnetic stirrer was thoroughly replaced by nitrogen gas. The autoclave was charged with 600 g of ethyl acetate, 91.5 g of perfluoro (propyl vinyl ether) (FPVE), 57.9 g of ethyl vinyl ether (EVE), and 30.3 g of 2-hydroxyethyl vinyl ether (HEVE), 60.0 g of ADEKA REASOAP NE-30 (manufactured by Asahi Denka Kogyo Co., Ltd.), 5.0 g of an azo group-containing polydimethylsiloxane VPS-1001 (manufactured by Wako Pure Chemicals Industries, Ltd.), and 1.5 g of dilauroyl peroxide (LPO). After cooling to –50° C. by a dry ice-methanol freezing mixture, nitrogen gas was again introduced to remove oxygen.

Then, 144.4 g of hexafluoro propylene (HFP) was added and the mixture was heated. When the temperature in the autoclave was 60° C., the pressure was 4.7 kgf/cm². The reaction was continued for 25 hours at 60° C. while stirring the mixture, until the pressure decreased to as low as 2.5 kgf/cm², whereupon the reaction was terminated by cooling the autoclave with water. When the reaction mixture was cooled to room temperature, unreacted monomers were removed and the autoclave was opened to obtain a polymer solution. The resulting polymer solution was poured into methanol to cause the polymer to precipitate. The precipitate was washed with methanol and dried under vacuum drying at 5° C. to obtain 306 g of fluorine-containing copolymer A8. The amount of monomers to produce this fluorine-containing copolymer A8, yield, polymerization conversion rate, and solid content concentration are shown in Table 5.

The polystyrene-reduced number average molecular weight of this fluorine-containing copolymer A8 measured by gel permeation chromatography using a 0.5% solution of the polymer in tetrahydrofuran (THF) was 38,000.

The glass-transition temperature (Tg) was measured by differential scanning calorimetry (DSC), the fluorine content was measured by the Alizarin Complexone method, and the hydroxyl value was measured by the acetylation method using acetic anhydride. The NMR analyses ($^1$H-NMR and $^{13}$C-NMR) and elemental analysis were performed. The proportion of monomer components forming the fluorine-containing copolymer A8 was determined from the fluorine content, the hydroxyl value, and the inorganic silica component which was measured from the amount of the residue after burning at 600° C. Results are shown in Table 6.

Preparation Examples 9 and 10

Comparative Preparation Examples 3 and 4

The fluorine-containing copolymers A9 and A10 and comparative copolymers B3 and B4 were prepared in the same manner as in Preparation Example 8, except for using monomers shown in Table 5. The proportion of each monomer component forming these copolymers and their properties are shown in Table 6.

The product of Comparative Preparation Example 3 is not the compound of the component (A) because of absence of the azo group-containing polysiloxane compound of the component (c), whereas the product of Comparative Preparation Example 4 is not the compound of the component (A) because of the smaller fluorine content.

TABLE 5

<Amount of monomers>

|  |  |  | Preparation Example | | | Comparative Preparation Example | |
|---|---|---|---|---|---|---|---|
|  |  |  | 8 | 9 | 10 | 3 | 4 |
|  | Polymers | | A8 | A9 | A10 | B3 | B4 |
| The charged amount (g) | (a) | HFP | 144.4 | 234.4 | 195.0 | 196.8 |  |
|  |  | FPVE | 91.5 |  |  | 79.1 | 32.3 |
|  |  | FPOPVE |  | 86.4 |  |  |  |
|  |  | CTFE |  |  |  |  | 209.4 |
|  | (b) | EVE | 57.9 |  | 74.4 | 61.3 |  |
|  |  | HEVE | 30.3 |  |  |  |  |
|  |  | HBVE |  | 18.6 | 17.1 | 42.4 | 49.3 |
|  |  | iso-BVE |  | 92.1 |  |  | 28.1 |
|  |  | CHVE |  |  | 4.9 |  | 103.3 |
|  |  | VPi |  | 20.4 |  |  |  |
|  |  | VAc |  |  | 21.7 |  |  |
|  | (c) ((e)) | VPS-1001 | 5.0 | 1.0 | 7.0 |  | 3.0 |
|  | (d) | NE-10 |  | 14.3 |  |  |  |
|  |  | NE-30 | 60.0 |  | 21.4 |  |  |
|  | Polymerization initiator LPO | | 1.5 | 2.0 |  | 1.5 | 1.5 |
| Yield (g) | | | 306 | 328 | 299 | 242 | 224 |
| Conversion (%) | | | 78 | 70 | 71 | 72 | 57 |
| Solid content (%) | | | 30.9 | 34.3 | 29.3 | 25.9 | 22.6 |

TABLE 6

<Copolymer composition>

| | | Polymer | Preparation Example A8 | A9 | A10 | Comparative Preparation Example B3 | B4 |
|---|---|---|---|---|---|---|---|
| Monomer component (mol %) | (a) | HFP | 36.7 | 46.2 | 40.0 | 35.6 | |
| | | FPVE | 14.1 | | 9.7 | 14.6 | |
| | | FPOPVE | | 5.9 | | | |
| | | CTFE | | | | | 52.1 |
| | (b) | EVE | 34.2 | | 31.7 | 35.5 | |
| | | HEVE | 12.1 | | | | |
| | | HBVE | | 6.9 | 5.1 | 14.3 | 12.4 |
| | | iso-BVE | | 33.2 | | | 8.8 |
| | | CHVE | | | 2.0 | | 24.9 |
| | | VPi | | 6.1 | | | |
| | | VAc | | 8.0 | | | |
| | (d) | NE-10 | | 0.7 | | | |
| | | NE-30 | 0.7 | | 0.5 | | |
| Structural unit derived from the component (c) (component (e)) (mol %) | | | 2.2 | 1.0 | 3.0 | 0 | 1.8 |
| Number average molecular weight | | | 38000 | 31000 | 31000 | 50000 | 24000 |
| Fluorine content (%) | | | 50.0 | 51.5 | 50.3 | 52.4 | 26.0 |
| Hydroxyl value (mg KOH/g) | | | 48 | 30 | 24 | 62 | 60 |
| Glass transition temperature (° C.) | | | 28 | 23 | 29 | 24 | 39 |

The abbreviations in Table 5 and Table 6 have the following meanings.

Component(a)
 HFP: hexafluoro propylene
 FPVE: perfluoro(propyl vinyl ether)
 FPOPVE: perfluoro(propoxypropyl vinyl ether)
 CTFE: chlorotrifluoroethylene Component(b)
 EVE: ethyl vinyl ether
 HFVE: hydroxyethyl vinyl ether
 HBVE: hydroxybutyl vinyl ether
 iso-BVE: isobutyl vinyl ether
 CHVE: cyclohexyl vinyl ether
 VPi: vinyl pivalate
 VAc: vinyl acetate Component (c)
 VPS-1001: Azo group containing polydimethylsiloxane of the above-mentioned general formula (12) (y=120–150, z=7–10, the number average molecular weight: 70,000–90,000, the molecular weight of polysiloxane segment: about 10,000, manufactured by Wako Pure Chemicals Industries, Ltd.)
 VPS-1001 is also a commercially available product of the component (e). Accordingly, this component is indicated as "component (c)(component (e))" in Table 6.

Component(d)
 NE-10: Nonionic reactive emulsifying agent shown by the above-mentioned general formula (13) (n=9, m=1, and s=10, ADEKA REASOAP NE-10 manufactured by Asahi Denka Kogyo Co., Ltd.)
 NE-30: Nonionic reactive emulsifying agent shown by the above-mentioned general formula (13) (n=9, m=1, and s=30, ADEKA REASOAP NE-30 manufactured by Asahi Denka Kogyo Co., Ltd.)

Thermopolymerization Initiator
 LPO: dilauroyl peroxide

Example 11

<Preparation of Curable Resin Composition (Resin Composition (II))>

32.0 g of the specific fluorine-containing polymer prepared in the Preparation Example 8, 32.0 g of 2F/4F/6F Copolymer KYNAR ADS (manufactured by Elf Atochem), 29.0 g of dipentaerythritol hexacrylate (DPHA), 4.5 g of N-vinyl pyrrolidone (VP), 2.0 g of radiation-active initiator Irgacure 907 (manufactured by Ciba. Specialty. Chemicals), and 0.5 g of diethylthioxanthone (DETX) were dissolved in 900 g of methyl isobutyl ketone (MIBK). The mixture was stirred for 2 hours at room-temperature to obtain a curable resin composition solution with an effective concentration of 10%.

<Formation and Evaluation of Cured Coatings of the Curable Resin Composition>

(Measurement of Refractive Index)

The above-mentioned curable resin composition solution was applied onto a silicone wafer using a spin coater to produce a coating with a thickness of about 0.1 $\mu$m after drying. The refractive index ($n_D^{25}$) at a wavelength of 539 nm of the resulting coating was measured at 25° C. using an ellipsometer.

(Measurement of Pencil Hardness)

The pencil hardness was measured according to JIS K5400.

(Measurement of Light Transmittance)

The above-mentioned curable resin composition was coated on a polyethylene terephthalate film using a bar coater. The coating was irradiated by ultraviolet radiation at 1 J/cm$^2$ in a nitrogen atmosphere to obtain a laminated film. Light transmittance of the film at a wavelength of 340–700 nm was measured.

(Measurement of Reflectance)

A delustering black spray, "Fast-drying acrylic lacquer spray-delustering blacks" (manufactured by Kanpeapio Co., Ltd.) was applied over the back of the film and dried. The reflectance of this film was measured using a spectrophotometer, Type U-3410 (manufactured by Hitachi, Ltd.), with an integrating sphere with a diameter 60 mm.

(Scratch Resistance Test)

A scratch resistance test was carried out to evaluate adhesion to the substrate of the cured coating. Specifically, the surface of the cured coating was repeatedly scratched 25 times at a load of 1 kg/cm$^2$ using Kimwipe (manufactured by Jujo Kimberley Co., Ltd.) to observe production of flaws on the surface of the cured coating by the naked eye. The samples with no flaws observed was rated "◯", those with delamination or lines of flaws on the surface of cured coating was rated as "×".

(Contact Angle (With Water))

The contact angle with purified water was measured.

Results of the above tests are shown in Table 8.

Examples 12–16 and

Comparative Examples 11–14

The curable resin compositions (Resin Compositions (II)) were prepared in the same manner as in Example 11, except for using the components shown in Table 7.

Cured coatings were formed from these curable resin compositions in the same manner as above to measure various properties. The results are shown in Table 8.

Here, Comparative Example 3, Comparative Example 5, and Comparative Example 6 are for compositions not containing the essential component (A) of the present invention, and the composition of Comparative Example 4 does not contain the essential component (B) of the present invention.

TABLE 7

| | | | <Amount of components> | | | | | | | | | |
|---|---|---|---|---|---|---|---|---|---|---|---|---|
| | | | Example | | | | | | Comparative Example | | | |
| | | | 11 | 12 | 13 | 14 | 15 | 16 | 3 | 4 | 5 | 6 |
| Composition (part by weight) | Component (A) | Kind | A1 | A1 | A2 | A2 | A3 | A3 | | A1 | | |
| | | Amount | 32.0 | 60.0 | 70.0 | 20.0 | 15.0 | 40.0 | | 70.0 | | |
| | Fluorine-containing polymer | KYNAR ADS | 32.0 | | | 40.0 | | | 63.5 | | | |
| | | Kind | | | | | B1 | | | | B1 | B2 |
| | | Amount | | | | | 50.0 | | | | 65.0 | 65.0 |
| | Component (B) | DPHA | 29.0 | | 27.5 | 27.5 | 15.0 | | 30.0 | | 32.5 | 32.5 |
| | | PETA | | 30.0 | | | | | | | | |
| | | TMPTA | | | | | 10.0 | 22.5 | | | | |
| | Component (C) | Irg. 907 | 2.0 | 2.0 | 2.0 | 2.0 | 2.0 | 2.0 | 2.0 | 2.0 | 2.0 | 2.0 |
| | | DETX | 0.5 | 0.5 | 0.5 | 0.5 | 0.5 | 0.5 | 0.5 | 0.5 | 0.5 | 0.5 |
| | Component (D) | VP | 4.5 | | | | | | 4.0 | 10.0 | | |
| | | 17F | | 7.5 | | | 17.5 | 35.0 | | 17.5 | | |
| | Solvent | MIBK | 900 | 900 | 900 | 900 | 900 | 900 | 900 | 900 | 900 | 900 |

The abbreviations in Table 7 stand for the following compound or polymers.

Fluorine-containing Polymers
 KYNAR ADS: Copolymer of vinylidene fluoride, tetrafluoroethylene, and hexafluoro propylene (manufactured by Elf Atochem)
 DPHA: Dipentaerythritol hexacrylate
 PETA: Pentaerythritol triacylate
 TMPTA: Trimethylolpropane triacrylate
Component (C)
 Irg.907: 2-Methyl-1-[4-(methylthio)phenyl]-2-morpholino-propan-1-one (manufactured by Ciba. Specialty. Chemicals.)
 DETX: Diethylthioxanthone
Component (D)
 VP: N-vinyl-2-pyrrolidone
 17F: Heptadecafluorodecyl acrylate
(Solvent)
 MIBK: methyl isobutyl ketone

TABLE 8

| | <Properties of composition> | | | | | | | | | |
|---|---|---|---|---|---|---|---|---|---|---|
| | Example | | | | | | Comparative Example | | | |
| | 11 | 12 | 13 | 14 | 15 | 16 | 3 | 4 | 5 | 6 |
| Refractive index ($n_D^{25}$) | 1.42 | 1.41 | 1.42 | 1.42 | 1.40 | 1.39 | 1.43 | 1.40 | 1.42 | 1.47 |
| Pencil hardness | 2H | H | 2H | H | H | H | 2H | 2B | 2H | H |
| Transmittance (%) | 95 | 97 | 96 | 96 | 97 | 98 | 95 | 98 | 96 | 91 |
| Reflectance (%) | 1.9 | 1.8 | 1.7 | 1.8 | 1.5 | 1.4 | 1.9 | 1.6 | 1.7 | 5.4 |
| Scratch resistance | ○ | ○ | ○ | ○ | ○ | ○ | X | X | X | X |
| Contact angle(water)(Degree) | 105 | 104 | 105 | 103 | 104 | 110 | 90 | 103 | 98 | 94 |

EFFECT OF THE INVENTION (1) The olefin copolymer of the present invention can produce cured coatings exhibiting excellent transparency, superior antireflection effect due to the low index of refraction, and high scratch resistance.

(2) The olefin copolymer of the present invention is soluble in common hydrocarbon solvents.

(3) The curable resin composition of the present invention exhibits superior thermosetting properties.

(4) The curable resin composition of the present invention can produce cured coatings exhibiting excellent transparency and durability, superior antireflection effect, a low index of refraction, and high scratch resistance.

(5) The curable resin composition of the present invention can produce cure coatings exhibiting high adhesion to substrates.

(6) The curable resin composition of the present invention can form cured coatings with excellent antifouling properties.

(7) The curable resin composition of the present invention can be suitably used as materials for forming antireflection films, optical materials such as optical fiber shells, and damp proof coating materials, as well as coating materials utilizing the weather resistant properties inherent to the fluorine-containing material, materials for weather-proof films, and other coating materials.

(8) The cured coating produced from the curable resin composition of the present invention exhibits excellent water repellency and weatherproofing characteristics, and can be suitably used as a water repellent and moisture-proofing coating material and as ultra-weatherproof paint and varnish.

(9) The curable resin composition of the present invention can provide inexpensive and environmentally safe material due to its excellent solubility in common hydrocarbon solvents and can exhibit excellent curability by radioactive rays.

(10) The cured coatings formed from the curable resin composition of the present invention can be applied to various display devices and can improve their visibility.

(11) The antireflection coating of the present invention made from a cured coating of the above-mentioned curable resin composition exhibits excellent scratch resistance and superior antireflection effect due to the low index of refraction and superior transparency to visible rays.

What is claimed is:

1. An olefin polymer comprising a polysiloxane segment in a main chain, having 30 wt % or more fluorine content, and having a polystyrene-reduced number average molecular weight of 5,000 or more.

2. An olefin polymer having a polystyrene-reduced number average molecular weight measured by gel permeation chromatography from 5,000 to 500,000 and comprising:

(a) 20 to 70 mol % of the structural unit represented by the following general formula (1),

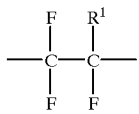

(1)

wherein $R^1$ represents a fluorine atom, a fluoro alkyl group, or the group —$OR^2$ wherein $R^2$ represents an alkyl group or a fluoro alkyl group, (b) 10 to 70 mol % of the structural unit represented by the following general formula (2),

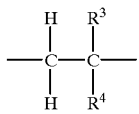

(2)

wherein $R^3$ represents a hydrogen atom or a methyl group and $R^4$ represents an alkyl group, the group represented by —$(CH_2)_x$—$OR^5$ wherein $R^5$ indicates an alkyl group, hydroxy alkyl group, or glycidyl group, and x is 0 or 1, the group represented by —$OCOR^5$, a carboxyl group, or an alkoxylcarbonyl group, and (c) 0.1 to 20 mol % of the structural unit represented by the following general formula (3),

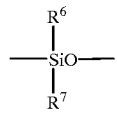

(3)

wherein $R^6$ and $R^7$ may be the same or different and individually represent a hydrogen atom, alkyl group, halogenated alkyl group, or aryl group.

3. The olefin polymer according to claim 2, further, comprising:

(d) 0.1 to 5 mol % of the structural unit represented by the following general formula (4),

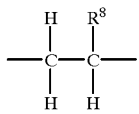

(4)

wherein $R^8$ represents a group which possesses emulsification function.

4. An olefin polymer having a polystyrene-reduced number average molecular weight measured by gel permeation chromatography from 5,000 to 500,000 and comprising:

(a) 20 to 70 mol % of the structural unit represented by the following general formula (1),

(1)

wherein $R^1$ represents a fluorine atom, a fluoro alkyl group, or the group —$OR^2$ wherein $R^2$ represents an alkyl group or a fluoro alkyl group, (b) 10 to 70 mol % of the structural unit represented by the following general formula (2),

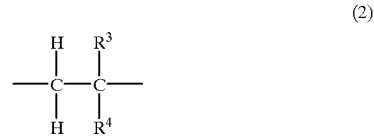

(2)

wherein $R^3$ represents a hydrogen atom or a methyl group and $R^4$ represents an alkyl group, the group represented by —$(CH_2)_x$—$OR^5$ wherein $R^5$ indicates an alkyl group, hydroxy alkyl group, or glycidyl group, and x is 0 or 1, the group represented by —$OCOR^5$, a carboxyl group, or an alkoxylcarbonyl group, and (e) 0.1 to 10 mol % as the group —$(OSiR^{15}R^{17})_y$—, wherein $R^{15}$ and $R^{17}$ individually represent a hydrogen atom or alkyl group, and y represents the number from 1 to 500 of the structural unit represented by the following general formula (5),

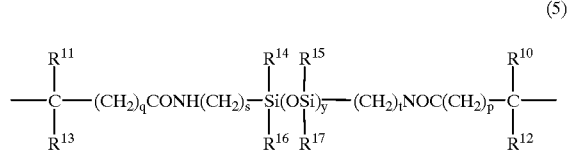

(5)

wherein $R^{10}$ to $R^{13}$ may be the same or different and individually represent a hydrogen atom, alkyl group, or cyano group, $R^{14}$ to $R^{17}$ may be the same or different and individually represent a hydrogen atom or alkyl group, p and q individually represent the number from 1 to 6, s and t individually represent the number from 0 to 6, and y represents the number from 1 to 500.

5. The olefin polymer according to claim 4, further comprising:

(d) 0.1 to 5 mol % of the structural unit represented by the following general formula (4),

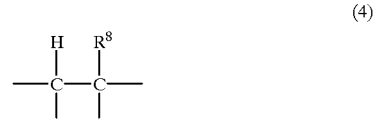

(4)

wherein $R^8$ represents a group which possesses emulsification function.

6. A curable resin composition comprising an olefin polymer having a polysiloxane segment in a main chain, having a fluorine content of 30 wt % or more, and a polystyrene-reduced number average molecular weight of 5,000 or more, and a solvent.

7. A curable resin composition comprising the olefin polymer according to claim 1 and a crosslinking compound.

8. A curable resin composition comprising a crosslinked polymer which is a reaction product of the olefin polymer according to claim 1 and a crosslinking compound.

9. A curable resin composition comprising,
(A) an olefin polymer comprising a polysiloxane segment in a main chain, having a fluorine content of 30 wt % or more, and having a polystyrene-reduced number average molecular weight of 5,000 or more,
(B) a polyfunctional (meth)acrylate compound which contains 2 or more (meth)acryloyl groups in the molecule, and
(C) a radiation-active initiator.

10. The olefin polymer according to claim 4, wherein y represents a number from 1 to 200.

11. A process comprising curing the olefin polymer of claim 1.

12. A process comprising curing the olefin polymer of claim 2.

13. A process comprising curing the olefin polymer of claim 3.

14. A process comprising curing the olefin polymer of claim 4.

15. A process comprising curing the olefin polymer of claim 5.

16. A process comprising curing the composition of claim 6.

17. A process comprising curing the composition of claim 7.

18. A process comprising curing the composition of claim 8.

* * * * *